(12) United States Patent
Evans et al.

(10) Patent No.: US 10,303,242 B2
(45) Date of Patent: May 28, 2019

(54) MEDIA CHAIR APPARATUS, SYSTEM, AND METHOD

(71) Applicant: Avegant Corp., Belmont, CA (US)

(72) Inventors: Allan Thomas Evans, San Francisco, CA (US); Warren Cornelius Welch, III, Foster City, CA (US); Edward Chia Ning Tang, Menlo Park, CA (US)

(73) Assignee: Avegant Corp., San Mateo, CA (US)

( * ) Notice: Subject to any disclaimer, the term of this patent is extended or adjusted under 35 U.S.C. 154(b) by 425 days.

(21) Appl. No.: 14/678,922

(22) Filed: Apr. 3, 2015

(65) Prior Publication Data

US 2016/0195921 A1   Jul. 7, 2016

Related U.S. Application Data

(63) Continuation-in-part of application No. 14/590,959, filed on Jan. 6, 2015.

(Continued)

(51) Int. Cl.
*G06F 3/01* (2006.01)
*A47C 7/72* (2006.01)
(Continued)

(52) U.S. Cl.
CPC ............... *G06F 3/011* (2013.01); *A47C 3/18* (2013.01); *A47C 7/006* (2013.01); *A47C 7/72* (2013.01);
(Continued)

(58) Field of Classification Search
CPC .... G06F 3/011; G06F 3/0338; G06F 3/03547; G06F 3/03549; G06F 3/0362; G06F 3/02;
(Continued)

(56) References Cited

U.S. PATENT DOCUMENTS

| 2,149,341 A | 3/1939 | Harrison |
| D132,442 S | 5/1942 | Montgomery |

(Continued)

FOREIGN PATENT DOCUMENTS

| CA | 2257445 A1 * | 7/1999 | ............... A47C 7/72 |
| CN | 2651774 | 10/2004 | |

(Continued)

OTHER PUBLICATIONS

"Binocular Disparity", Collins English Dictionary, <http://www.dictionary.com/browse/binocular-disparity, Retrieved on Apr. 11, 2016, 2 pages.

(Continued)

*Primary Examiner* — Milton Nelson, Jr.
(74) *Attorney, Agent, or Firm* — HIPLegal LLP; Judith Szepesi

(57) ABSTRACT

A media chair apparatus (200), system (100), and method (900). The media chair apparatus (200) includes a support assembly (400) that can be at least temporarily substantially fixed in an at least substantially fixed position while a seat assembly (300) rotates relative to the support assembly (400). A port (500) in the support assembly (400) can be used to interface with the operating environment (80) while a port (500) in the rotatable seat assembly (300) can be used to interface with a portable access device (150) used by the user (90) to access or otherwise enhance a media experience (800).

19 Claims, 8 Drawing Sheets

Related U.S. Application Data

(60) Provisional application No. 61/924,209, filed on Jan. 6, 2014.

(51) Int. Cl.
| | |
|---|---|
| *G06F 3/0362* | (2013.01) |
| *G06F 3/03* | (2006.01) |
| *G06F 3/02* | (2006.01) |
| *G06F 3/0354* | (2013.01) |
| *A47C 7/00* | (2006.01) |
| *A47C 3/18* | (2006.01) |
| *G06F 3/0338* | (2013.01) |

(52) U.S. Cl.
CPC .............. *G06F 3/02* (2013.01); *G06F 3/03* (2013.01); *G06F 3/0338* (2013.01); *G06F 3/0362* (2013.01); *G06F 3/03547* (2013.01); *G06F 3/03549* (2013.01)

(58) Field of Classification Search
CPC .. G06F 3/03; A47C 7/72; A47C 7/006; A47C 3/18
USPC ...... 297/217.4, 217.3, 217.5, 344.21, 344.22
See application file for complete search history.

(56) References Cited

U.S. PATENT DOCUMENTS

| | | |
|---|---|---|
| 3,356,439 A | 12/1967 | Magnus |
| D246,259 S | 11/1977 | Nishimura et al. |
| D254,183 S | 2/1980 | Doodson |
| D262,019 S | 11/1981 | Upshaw |
| D270,634 S | 9/1983 | Ungar |
| 4,459,470 A | 7/1984 | Shlichta et al. |
| 4,553,534 A * | 11/1985 | Stiegler ............ A42B 3/0406 600/28 |
| 4,859,030 A | 8/1989 | Rotier |
| 4,961,626 A | 10/1990 | Fournier et al. |
| D313,092 S | 12/1990 | Nilsson |
| 5,047,006 A * | 9/1991 | Brandston ............ A61M 21/00 250/228 |
| 5,095,382 A | 3/1992 | Abe |
| 5,106,179 A | 4/1992 | Kamaya et al. |
| D328,461 S | 8/1992 | Daido et al. |
| 5,140,977 A * | 8/1992 | Raffel ............ A47C 3/02 5/915 |
| D338,010 S | 8/1993 | Yamatogi |
| 5,266,070 A * | 11/1993 | Hagiwara ............ A61M 21/00 600/27 |
| 5,303,085 A | 4/1994 | Rallison |
| 5,467,104 A | 11/1995 | Furness et al. |
| 5,552,922 A | 9/1996 | Magarill |
| 5,624,156 A * | 4/1997 | Leal ............ A47C 7/72 297/217.3 |
| D388,114 S | 12/1997 | Ferro |
| 5,794,127 A | 8/1998 | Lansang |
| 5,844,656 A | 12/1998 | Ronzani et al. |
| 5,886,822 A | 3/1999 | Spitzer |
| 5,915,783 A * | 6/1999 | McDowell ............ A47C 7/748 219/217 |
| 5,931,534 A * | 8/1999 | Hutter ............ A47C 3/18 297/217.3 |
| 5,945,965 A | 8/1999 | Inoguchi et al. |
| 5,984,477 A | 11/1999 | Weissman et al. |
| 5,991,085 A | 11/1999 | Rallison et al. |
| 5,991,087 A | 11/1999 | Rallison |
| 6,008,781 A | 12/1999 | Furness et al. |
| 6,016,385 A * | 1/2000 | Yee ............ B25J 3/04 446/327 |
| 6,097,543 A | 8/2000 | Rallison et al. |
| 6,185,045 B1 | 2/2001 | Hanano |
| 6,342,871 B1 | 1/2002 | Takeyama |
| 6,351,252 B1 | 2/2002 | Atsumi et al. |
| 6,386,706 B1 | 5/2002 | McClure et al. |
| 6,437,915 B2 | 8/2002 | Moseley et al. |
| D467,580 S | 12/2002 | Mori |
| D484,485 S | 12/2003 | Matsuoka |
| 6,678,897 B2 | 1/2004 | Lindgren |
| 6,721,750 B1 | 4/2004 | Jones et al. |
| 6,724,906 B2 | 4/2004 | Naksen et al. |
| 6,932,090 B1 | 8/2005 | Reschke et al. |
| 7,245,735 B2 | 7/2007 | Plan |
| 7,275,826 B2 | 10/2007 | Liang |
| D556,187 S | 11/2007 | Feng |
| D560,654 S | 1/2008 | Feng |
| D567,215 S | 4/2008 | Lee |
| D570,825 S | 6/2008 | Schultz et al. |
| 7,388,960 B2 | 6/2008 | Kuo et al. |
| 7,431,392 B2 * | 10/2008 | Tamara ............ A47C 7/72 297/217.4 |
| D587,683 S | 3/2009 | Ham et al. |
| 7,604,348 B2 | 10/2009 | Jacobs et al. |
| 7,697,203 B2 | 4/2010 | Cha et al. |
| 7,735,154 B2 | 6/2010 | Gellis et al. |
| D632,668 S | 2/2011 | Brunner et al. |
| D638,397 S | 5/2011 | McManigal |
| D640,256 S | 6/2011 | So |
| 7,959,296 B2 | 6/2011 | Cowan et al. |
| 8,006,320 B1 | 8/2011 | Rohbani |
| 8,057,036 B2 | 11/2011 | Hess et al. |
| 8,094,120 B2 | 1/2012 | Ratai |
| 8,094,927 B2 | 1/2012 | Jin et al. |
| 8,106,938 B2 | 1/2012 | Tzschoppe |
| D656,480 S | 3/2012 | McManigal et al. |
| 8,144,079 B2 | 3/2012 | Mather et al. |
| 8,144,274 B2 | 3/2012 | Lee |
| D657,344 S | 4/2012 | Brunner et al. |
| 8,149,342 B2 | 4/2012 | Ijzerman et al. |
| 8,154,800 B2 | 4/2012 | Kean et al. |
| 8,162,482 B2 | 4/2012 | DeCusatis et al. |
| D660,823 S | 5/2012 | Nardi et al. |
| D660,824 S | 5/2012 | Nardi et al. |
| 8,194,058 B2 | 6/2012 | Shestak et al. |
| 8,208,715 B2 | 6/2012 | Lau et al. |
| 8,212,810 B2 | 7/2012 | Naske et al. |
| 8,243,126 B2 | 8/2012 | Louwsma et al. |
| 8,244,027 B2 | 8/2012 | Takahashi |
| 8,284,235 B2 | 10/2012 | Held et al. |
| D673,136 S | 12/2012 | Kelly et al. |
| D673,520 S | 1/2013 | Tan |
| D674,767 S | 1/2013 | Brunner et al. |
| 8,362,974 B2 | 1/2013 | Miyake et al. |
| D675,595 S | 2/2013 | Cho et al. |
| D683,329 S | 5/2013 | Hagelin |
| 8,451,229 B2 | 5/2013 | Otsuki et al. |
| 8,508,830 B1 | 8/2013 | Wang |
| 8,545,013 B2 | 10/2013 | Hwang et al. |
| D693,791 S | 11/2013 | Troy |
| D695,263 S | 12/2013 | Mogili |
| 8,605,935 B1 | 12/2013 | Huang |
| D697,495 S | 1/2014 | Lian |
| D699,702 S | 2/2014 | Chen |
| D704,704 S | 5/2014 | Tatara et al. |
| D709,880 S | 7/2014 | Kim et al. |
| D715,255 S | 10/2014 | Nunez et al. |
| D720,721 S | 1/2015 | Lu |
| D722,041 S | 2/2015 | Sparks et al. |
| 8,964,298 B2 | 2/2015 | Haddick et al. |
| D724,560 S | 3/2015 | Galler |
| D727,278 S | 4/2015 | Solomon et al. |
| D727,280 S | 4/2015 | Levine |
| D727,281 S | 4/2015 | Levine |
| D727,288 S | 4/2015 | Yamasaki et al. |
| D728,512 S | 5/2015 | Nakagawa |
| D729,196 S | 5/2015 | Liu |
| D729,198 S | 5/2015 | Brunner et al. |
| 9,036,849 B2 | 5/2015 | Thompson et al. |
| 9,042,948 B2 | 5/2015 | Serota |
| D733,090 S | 6/2015 | Petersen |
| 9,158,115 B1 | 10/2015 | Worley et al. |
| 9,223,136 B1 | 12/2015 | Braun et al. |
| 9,529,191 B2 | 12/2016 | Sverdrup et al. |
| 9,603,457 B2 * | 3/2017 | Massaud ............ A47C 7/725 |

(56) References Cited

U.S. PATENT DOCUMENTS

| | | |
|---|---|---|
| 2002/0070590 A1* | 6/2002 | Carstens .............. A47C 3/18 297/217.3 |
| 2002/0089469 A1 | 7/2002 | Cone et al. |
| 2002/0175880 A1 | 11/2002 | Melville et al. |
| 2002/0186180 A1 | 12/2002 | Duda |
| 2003/0058209 A1 | 3/2003 | Balogh |
| 2003/0095081 A1 | 5/2003 | Furness et al. |
| 2003/0164814 A1 | 9/2003 | Starkweather et al. |
| 2003/0210801 A1 | 11/2003 | Naksen et al. |
| 2003/0227465 A1 | 12/2003 | Morgan et al. |
| 2004/0113867 A1 | 6/2004 | Tomine et al. |
| 2005/0116922 A1 | 6/2005 | Kim |
| 2005/0195277 A1 | 9/2005 | Yamasaki |
| 2005/0206583 A1 | 9/2005 | Lemelson et al. |
| 2006/0028400 A1 | 2/2006 | Lapstun et al. |
| 2006/0181482 A1 | 8/2006 | Iaquinto |
| 2006/0181484 A1 | 8/2006 | Sprague et al. |
| 2006/0238717 A1 | 10/2006 | Maximus et al. |
| 2007/0081248 A1 | 4/2007 | Wu |
| 2007/0091272 A1 | 4/2007 | Lerner et al. |
| 2007/0093118 A1* | 4/2007 | Pond ................ A61B 17/00 439/409 |
| 2007/0097277 A1 | 5/2007 | Hong et al. |
| 2007/0273983 A1 | 11/2007 | Hebert |
| 2008/0158672 A1 | 7/2008 | McCosky |
| 2009/0015917 A1 | 1/2009 | Iwamoto et al. |
| 2009/0039692 A1* | 2/2009 | Tuckey ............... A47D 1/008 297/344.22 |
| 2009/0152915 A1* | 6/2009 | Krasna ............... A47C 1/0342 297/217.3 |
| 2009/0206641 A1* | 8/2009 | Brown, Jr. ........... A47C 7/72 297/217.3 |
| 2009/0262044 A1 | 10/2009 | Otsuki et al. |
| 2009/0276238 A1 | 11/2009 | Filipovich et al. |
| 2010/0007852 A1 | 1/2010 | Bietry et al. |
| 2010/0053729 A1 | 3/2010 | Tilleman et al. |
| 2010/0073469 A1 | 3/2010 | Fateh |
| 2010/0103676 A1 | 4/2010 | Noeth |
| 2010/0182688 A1 | 7/2010 | Kim et al. |
| 2010/0231579 A1 | 9/2010 | Kanbayashi et al. |
| 2010/0301640 A1* | 12/2010 | Heiser ................ A47C 1/06 297/135 |
| 2011/0002533 A1 | 1/2011 | Inoue et al. |
| 2011/0007132 A1 | 1/2011 | Redmann et al. |
| 2011/0018903 A1 | 1/2011 | Lapstun et al. |
| 2011/0037829 A1 | 2/2011 | Hata |
| 2011/0044046 A1 | 2/2011 | Abu-Ageel |
| 2011/0063203 A1 | 3/2011 | Hong |
| 2011/0085727 A1 | 4/2011 | Yoon et al. |
| 2011/0086747 A1* | 4/2011 | Broderick ............. A63F 13/24 482/142 |
| 2011/0096147 A1 | 4/2011 | Yamazaki et al. |
| 2011/0109133 A1* | 5/2011 | Galbreath ............ A47C 7/748 297/217.3 |
| 2011/0134229 A1 | 6/2011 | Matsumoto et al. |
| 2011/0134497 A1 | 6/2011 | Horimai |
| 2011/0141240 A1 | 6/2011 | Dutta et al. |
| 2011/0141244 A1 | 6/2011 | Vos et al. |
| 2011/0157696 A1 | 6/2011 | Bennett et al. |
| 2011/0193248 A1 | 8/2011 | Hsu |
| 2011/0227820 A1 | 9/2011 | Haddick et al. |
| 2011/0254834 A1 | 10/2011 | Jeon et al. |
| 2011/0273365 A1 | 11/2011 | West et al. |
| 2011/0273662 A1 | 11/2011 | Hwang et al. |
| 2012/0007800 A1 | 1/2012 | Jaroslaw |
| 2012/0033061 A1 | 2/2012 | Ko et al. |
| 2012/0050503 A1 | 3/2012 | Kraft |
| 2012/0059464 A1 | 3/2012 | Zhao |
| 2012/0069131 A1 | 3/2012 | Abelow |
| 2012/0084652 A1 | 4/2012 | Bauza et al. |
| 2012/0086917 A1 | 4/2012 | Okuda et al. |
| 2012/0105310 A1 | 5/2012 | Sverdrup et al. |
| 2012/0105740 A1 | 5/2012 | Jannard et al. |
| 2012/0120498 A1 | 5/2012 | Harrison et al. |
| 2012/0127062 A1 | 5/2012 | Bar-Zeev et al. |
| 2012/0195454 A1 | 8/2012 | Nishihara et al. |
| 2012/0212398 A1 | 8/2012 | Border et al. |
| 2012/0244812 A1 | 9/2012 | Rosener |
| 2012/0262477 A1 | 10/2012 | Buchheit |
| 2012/0262549 A1 | 10/2012 | Ferguson |
| 2012/0262562 A1 | 10/2012 | Fukutake et al. |
| 2012/0280941 A1 | 11/2012 | Hu |
| 2012/0307357 A1 | 12/2012 | Choi et al. |
| 2013/0002660 A1 | 1/2013 | Chikazawa |
| 2013/0010055 A1 | 1/2013 | Raju et al. |
| 2013/0044939 A1 | 2/2013 | Li |
| 2013/0057961 A1 | 3/2013 | Evans et al. |
| 2013/0120265 A1* | 5/2013 | Horii .................. G06F 1/1616 345/168 |
| 2013/0127980 A1 | 5/2013 | Haddick et al. |
| 2013/0147791 A1 | 6/2013 | Gilberton et al. |
| 2013/0160039 A1 | 6/2013 | Mentz et al. |
| 2013/0182086 A1 | 7/2013 | Evans et al. |
| 2013/0194244 A1 | 8/2013 | Tamir |
| 2013/0201080 A1 | 8/2013 | Evans et al. |
| 2013/0258463 A1 | 10/2013 | Evans et al. |
| 2013/0278631 A1 | 10/2013 | Border et al. |
| 2013/0293531 A1 | 11/2013 | Cao et al. |
| 2013/0307842 A1 | 11/2013 | Grinberg et al. |
| 2013/0314303 A1 | 11/2013 | Osterhout et al. |
| 2013/0314615 A1 | 11/2013 | Allen et al. |
| 2013/0342904 A1 | 12/2013 | Richards |
| 2014/0043320 A1 | 2/2014 | Tosaya et al. |
| 2014/0063055 A1 | 3/2014 | Osterhout et al. |
| 2014/0139652 A1 | 5/2014 | Alden et al. |
| 2014/0139927 A1 | 5/2014 | Hiraide |
| 2014/0200079 A1 | 7/2014 | Bathiche et al. |
| 2014/0253698 A1 | 9/2014 | Evans et al. |
| 2015/0028755 A1 | 1/2015 | Chang et al. |
| 2015/0060811 A1 | 3/2015 | Shiratori |
| 2015/0091781 A1 | 4/2015 | Yu et al. |
| 2015/0097759 A1 | 4/2015 | Evans et al. |
| 2015/0103152 A1 | 4/2015 | Qin |
| 2015/0331246 A1 | 11/2015 | Dewald et al. |
| 2016/0018639 A1 | 1/2016 | Spitzer et al. |
| 2016/0033771 A1 | 2/2016 | Tremblay et al. |
| 2016/0195718 A1 | 7/2016 | Evans |
| 2016/0198133 A1 | 7/2016 | Evans |
| 2016/0291326 A1 | 10/2016 | Evans et al. |
| 2016/0292921 A1 | 10/2016 | Evans et al. |
| 2016/0295202 A1 | 10/2016 | Evans et al. |
| 2017/0068311 A1 | 3/2017 | Evans et al. |
| 2017/0139209 A9 | 5/2017 | Evans et al. |

FOREIGN PATENT DOCUMENTS

| | | |
|---|---|---|
| CN | 202306016 U | 7/2012 |
| WO | 2008070683 A1 | 6/2008 |
| WO | 2011097226 A1 | 8/2011 |
| WO | 2011137034 A1 | 11/2011 |
| WO | 2012000457 A1 | 1/2012 |
| WO | 2012098534 A1 | 7/2012 |
| WO | 2013012259 A2 | 1/2013 |

OTHER PUBLICATIONS

NPL—Chapter 2—Principles of Stereoscopic Depth Perception and Reproduction, 2007.
PCT/US14/023799, International Preliminary Report on Patentability, dated Jul. 21, 2014, 6 pages.
PCT/US14/23799, International Search Report, dated Jul. 21, 2014, 2 pages.
PCT/US14/59579 International Search Report, dated Jan. 5, 2015, 1 page.
PCT/US2014/059579 International Preliminary Report on Patentability, dated Apr. 12, 2016, 6 pages.
PCT/US2015/010372 International Preliminary Report on Patentability, dated Jul. 12, 2016, 6 pages.
PCT/US2015/010372 International Search Report, dated Apr. 21, 2015, 2 pages.

(56) References Cited

OTHER PUBLICATIONS

PCT/US2015/010377 International Search Report, dated Apr. 28, 2015, 2 pages.
PCT/US2015/010377 International Preliminary Report on Patentability, dated Jul. 12, 2016, 6 pages.
PCT/US2015/031649 International Search Report, dated Nov. 24, 2015, 3 pages.
PCT/US2015/031649 Written Opinion of the International Searching Authority, dated Nov. 24, 2015, 6 pages.
PCT/YS2015/010380 International Preliminary Report on Patentability, dated Jul. 12, 2016, 7 pages.
PCT/YS2015/010380 International Search Report, dated Apr. 22, 2015, 2 pages.
Qian, Ning, "Binocular Disparity and the Perception of Depth", Neuron, vol. 18, Mar. 1997, 359-368.
Rainbow Symphony, Pulfrich 3D Glasses, <http://www.3dglasses.net/Pulfrich%203D%20Glasses.htm>, Retrieved on Jul. 27, 2016, 2 pages.
Ruxandra Serbanescu, "Polarization of light", 2009.

* cited by examiner

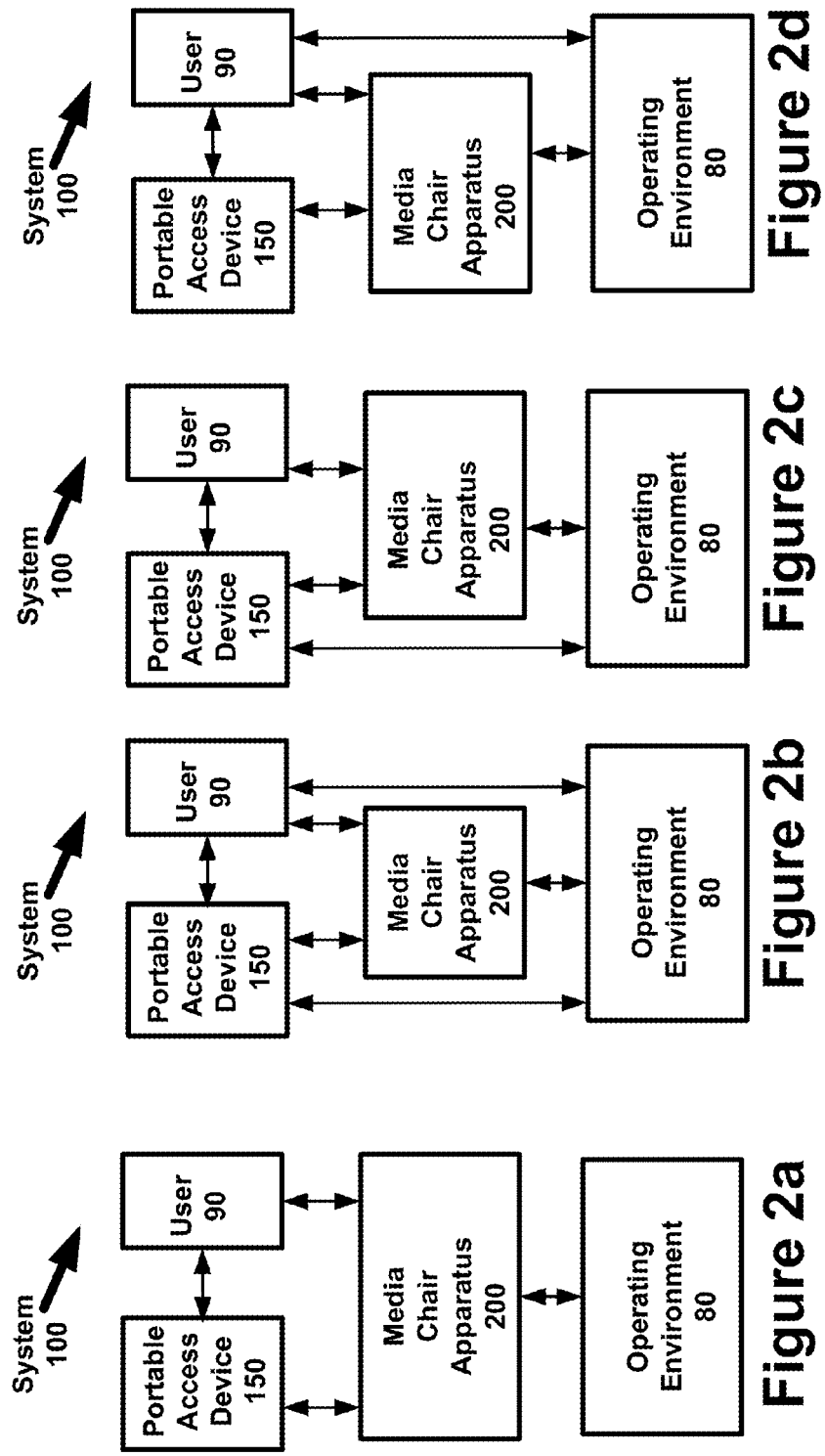

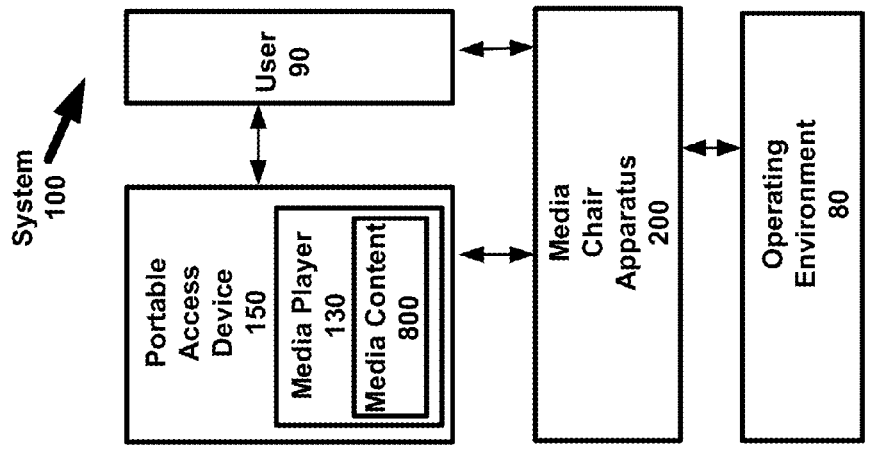
Figure 2g
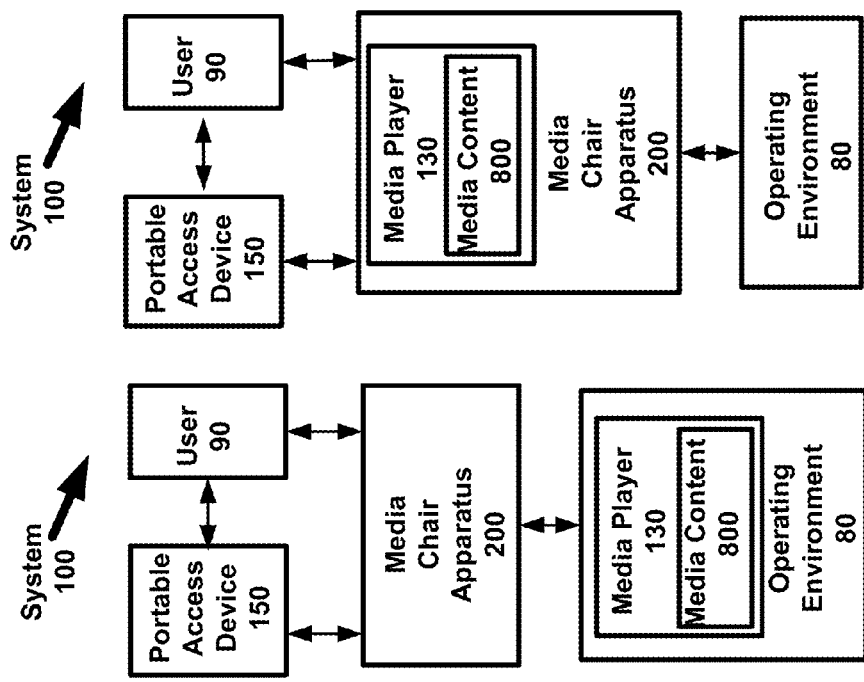
Figure 2f
Figure 2e

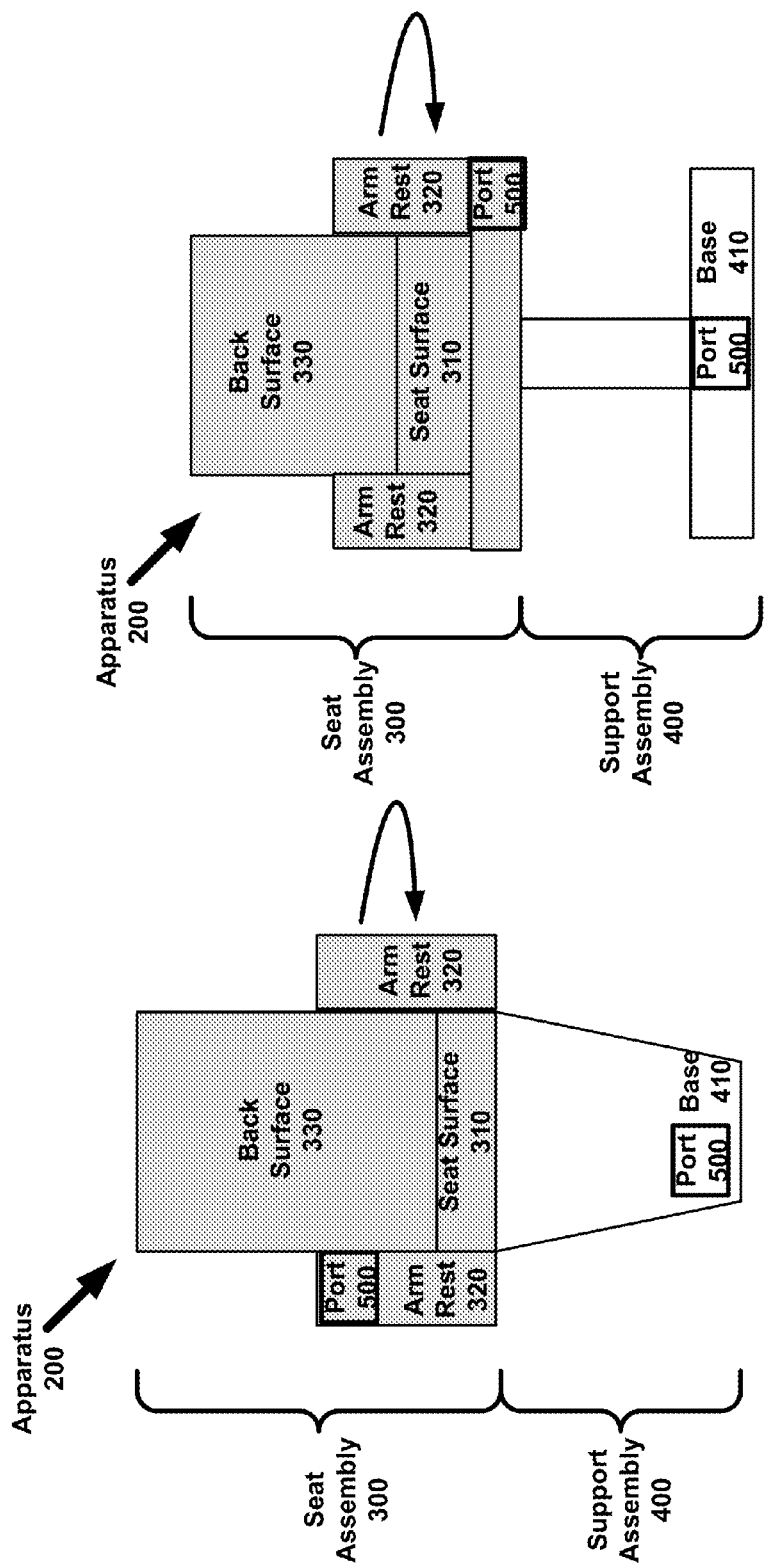

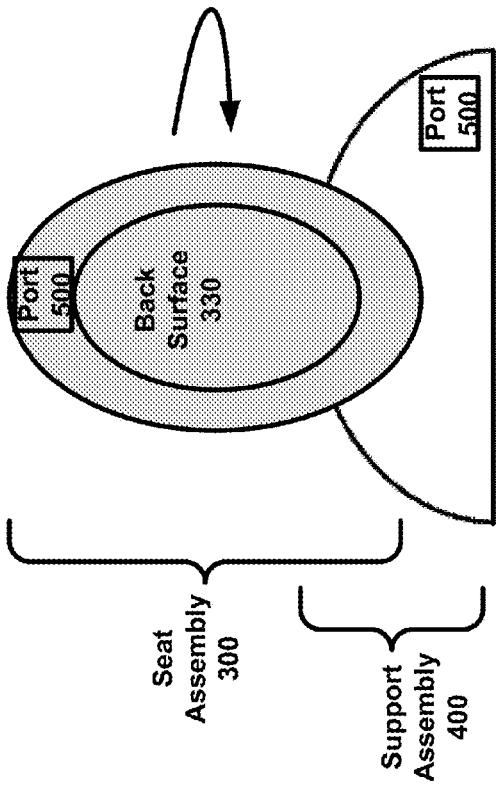
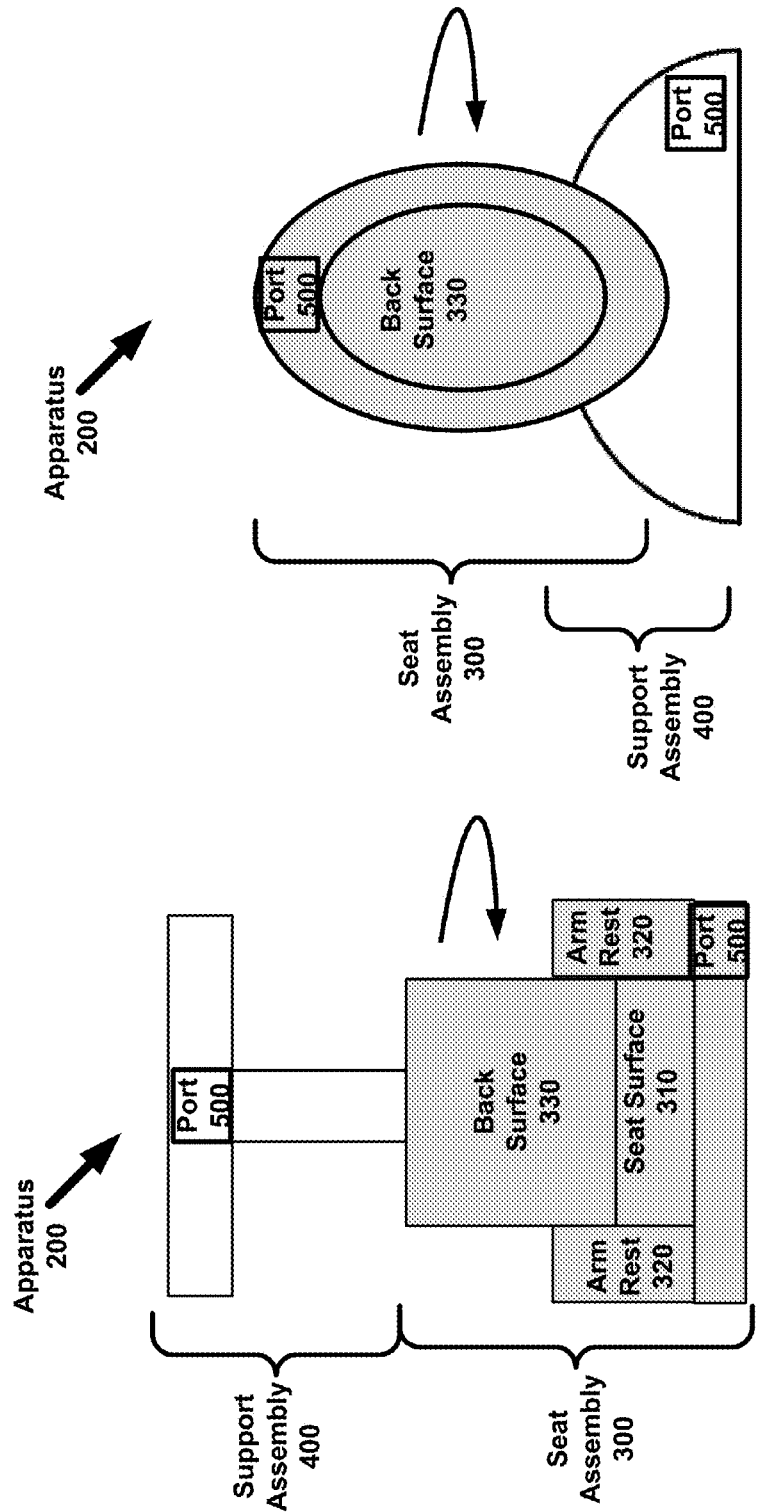

MEDIA CHAIR APPARATUS, SYSTEM, AND METHOD

RELATED APPLICATIONS

This utility patent application claims priority to the following patent applications where are hereby incorporate by reference in their entirety: (a) the provisional patent application titled "NEAR-EYE DISPLAY APPARATUS AND METHOD" (Ser. No. 61/924,209) that was filed on Jan. 6, 2014; and (b) the utility patent application titled "SYSTEM, METHOD, AND APPARATUS FOR DISPLAYING AN IMAGE WITH REDUCE COLOR BREAKUP" (Ser. No. 14/590,959) that was filed on Jan. 6, 2015.

BACKGROUND OF THE INVENTION

The invention is a media chair apparatus, system, and method (collectively, the "system"). More specifically, the system includes a media chair apparatus that serves as a useful interface between a user and an information technology architecture accessed by the user in enjoying a media experience.

The ways in which individuals interact with and experience media is changing. There is increasingly reliance on portable and personal devices such as smart phones, tablet computers, and laptop computers. While personal audio systems can trace their origins back to the WALKMAN portable radio and cassette player by SONY which made its debut in 1979, the world of personal video systems is only just beginning to get started. Wearable video systems such as the GLYPH virtual retina display visor by AVEGANT are just now being marketed to the public. An expanding range of different devices used by human beings to engage in media experiences.

While there is a seemingly unending desire to make personal media devices faster and smaller, there continue to be fully unutilized opportunities to enhance the media experience of users. One such unutilized opportunity is the ubiquitous chair. Chairs are utilized in offices and homes alike. Chairs are utilized by business people at work as well as by consumers engaged in playing video games, watching a movie, or searching the Internet.

Chairs represent an unused opportunity by users to avoid tangled wires, as well as to otherwise enhance the ways in which a user interacts with a media experience.

SUMMARY OF THE INVENTION

The invention is a media chair apparatus, system, and method (collectively, the "system"). More specifically, the system includes a media chair apparatus that serves as a useful interface between a user and an information technology architecture accessed by the user in enjoying a media experience.

The media chair apparatus can be comprised of a seat assembly that provides the user with a substantial capability to rotate relative to a support assembly. In contrast, the support assembly that supports the seat assembly can provide for being at least temporarily fixed with the respect to the rotating seat assembly. This configuration is particularly useful when one or more wires from the operating environment are connected to the at least temporarily non-rotating support assembly while permitting rotational movement in excess of 360 degrees of the seat assembly even though one or more wires from the rotating seat assembly may be connected to a portable access device such as a wearable media device worn by the user sitting in the media chair apparatus.

Some embodiments of the media chair apparatus can include a wide variety of useful components that provide desirable functionality in the context of delivering a media experience to the user. The media chair apparatus can serve as a useful interface for a wide variety of media experiences.

BRIEF DESCRIPTION OF THE DRAWINGS

Many features and inventive aspect of the system are illustrated in the following drawings described below. No set of drawings can disclose all possible components of an invention and all possible configurations of an invention. All element numbers used in the following drawings are listed in Table 1 of the Detailed Description section. Table 1 consists of a chart that indexes element numbers, element names, and element definitions/descriptions.

FIG. 2a is a block diagram illustrating an example of different interactions between system components. In FIG. 2a, the media chair apparatus is the exclusive interface between the operating environment and both the user and the portable access device.

FIG. 2b is a block diagram illustrating an example of different interactions between system components. In FIG. 2b, the both the user and the portable access device have some direct interactions with the operating environment FIG. 2c is a block diagram illustrating an example of different interactions between system components. In FIG. 2c, the portable access device has some direct interactions with the operating environment while the user does not.

FIG. 2d is a block diagram illustrating an example of different interactions between system components. In FIG. 2d, the user has some direct interactions with the operating environment, but the portable access device does not.

FIG. 2e is a block diagram illustrating an example of different interactions between system components. In FIG. 2e, the media chair apparatus is the exclusive interface for both the user and the portable access device (consistent with FIG. 2a) and the media player is within the operating environment.

FIG. 2f is a block diagram illustrating an example of different interactions between system components. In FIG. 2e, the media chair apparatus is the exclusive interface for both the user and the portable access device (consistent with FIG. 2a) and the media player is within the media chair apparatus.

FIG. 2g is a block diagram illustrating an example of different interactions between system components. In FIG. 2e, the media chair apparatus is the exclusive interface for both the user and the portable access device (consistent with FIG. 2a) and the media player is within the portable access device.

FIG. 4b is a diagram illustrating an example of a front view of a media chair apparatus.

FIG. 4c is a diagram illustrating an example of a front view of a media chair apparatus.

FIG. 4d is a diagram illustrating an example of a front view of a media chair apparatus.

FIG. 4e is a diagram illustrating an example of a front view of a media chair apparatus.

DETAILED DESCRIPTION

The invention is a media chair apparatus, system, and method (collectively, the "system"). More specifically, the system includes a media chair apparatus that serves as a useful interface between a user and an information technology architecture accessed by the user in enjoying a media experience. All element numbers used below are listed in Table 1, a chart that indexes element numbers, element names, and element definitions/descriptions.

I. Overview

Figure 1A:
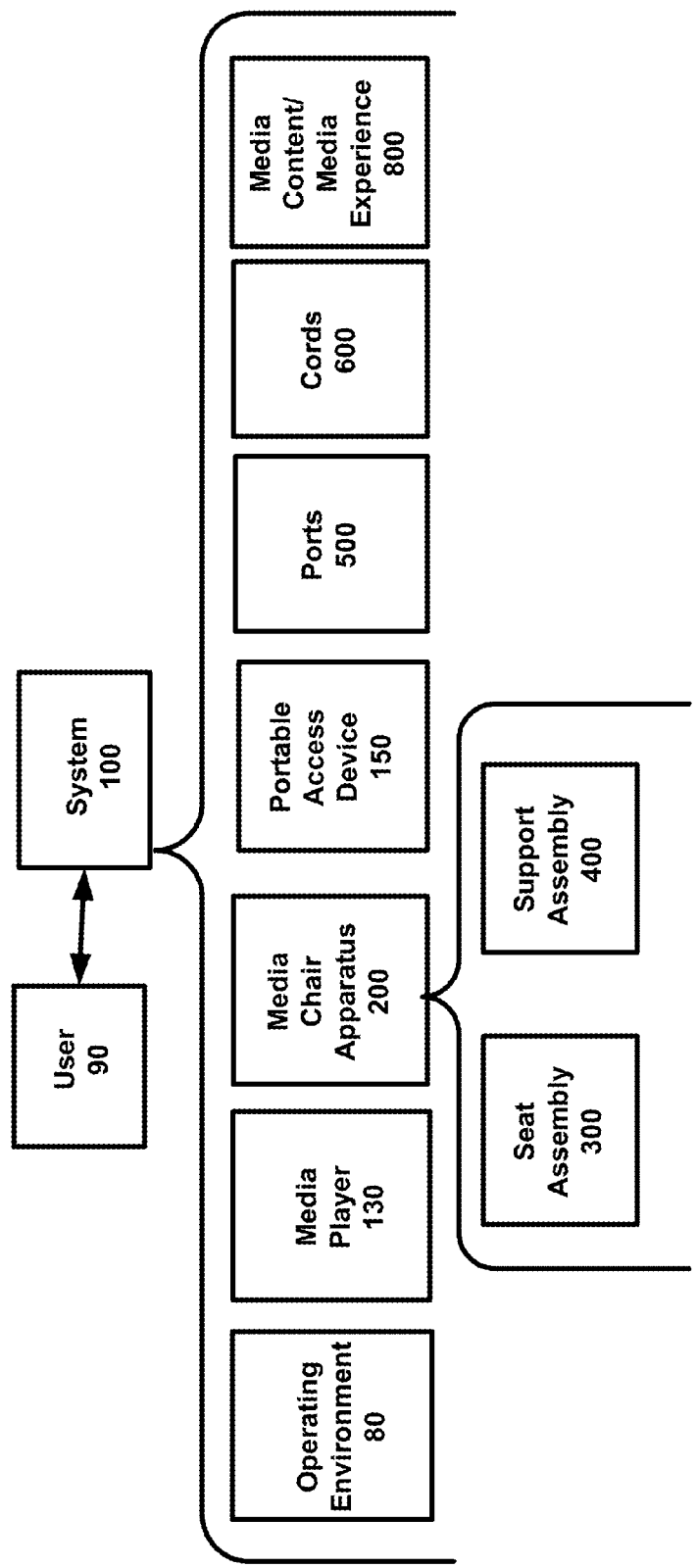
FIG. 1a is a block diagram illustrating an example of a user interacting with a system that is comprised of a variety of components.

FIG. 1a is a block diagram illustrating a user 90 interacting with a system 100 for engaging in a media experience 800, which can also be referred to as accessing media content 800. The user 90 accesses the media content 800 though the system 100. The system 100 can include a wide variety of different components and different configurations of components. The system 100 includes a media chair apparatus 200 that can provide a useful interface between the user 90 and the media experience 800. As illustrated in FIG. 1a, the system 100 can include a variety of different components that enrich the media experience 800 of the user 90.

A. Media Content/Media Experience

The system 100 can be used to enable the user 90 to engage in a wide variety of different media experiences 800, such as playing music, viewing still frame images, viewing videos, playing video games, engaging in a in an augmented reality experience, engaging in a virtual reality experience, and other types of media content 800. Typical media content 800 is engaged using the senses of sight and/or sound, but the senses of touch, taste, and smell are also capable of being utilized by the system 100. Some media content 800 is non-interactive (such as listening to a song or watching a video), but media content 800 can also provide for interactive media content 800 such as video games, expert systems, augmented reality experiences, virtual reality experiences, and otherwise non-interactive experiences where the system 100 attempts to selectively influence the selection and/or playing of media content 800 based on feedback from the user 800.

As listed in Table 1, media content 800 can include audio attributes and/or visual attributes such as video attributes. Some embodiments of media content 800 can even include tactile attributes, olfactory attributes, and gustatory attributes. It is anticipated that the scope of media content 800 will continue to expand, and that the system 100 can be implemented to accommodate those expansions.

B. Media Player

Media content 800 can be in variety of different digital or analog formats and delivered to users 90 using a variety of different technologies and media. Media content Media content 800 can be stored on a disc such as a CD, a DVD, or a BLU-RAY disc. Media content 800 can also be broadcast in the airwaves, streamed over the Internet, or delivered to users through a cable box or satellite dish/box. Media content 800 can be stored as files and/or programs on a computer.

A media player 130 is potentially any device capable of playing the media content 800 for the user 90. The wide range of media players is commensurate with the wide range of different formats and types of media content 800. Examples of media players 130 can include but are not limited to CD players, DVD players, BLU-RAY players, cable boxes, satellite boxes, and computers.

The system 100 can be configured in a wide variety of different ways. The media player 130 may be a stand-alone device, or device that provides other functions. For example, some embodiments of a portable access device 150 may include the capabilities of media player 130. For example, a smart phone or tablet computer used as a portable access device 80 to access media content 800 can also function as the media player 130 for that media content 800. In other embodiments, the portable access device 150 may be something like headphones or a visor worn on the head of the user 90 that delivers audio and/or visual content to the user 90.

Media players 130 can also be devices within an operating environment 80 of the media chair apparatus 200 as well as devices within the media chair apparatus 200.

C. Operating Environment

The system 100 can include a wide variety of different devices and services within an operating environment 80 of the user 90. For example, the user 90 may be seated on the media chair apparatus 200 accessing media content 800 from a portable access device 130. Power for the portable access device 150 may be provided by a port 500 in the operating environment 80, such as a power outlet in an office or family room wall. Some or all of the media content 800 can originate from the operating environment 80. As discussed above, the media player 130 will often be a device in the operating environment 80 of the media chair apparatus 200. The operating environment 80 can include a wide variety of components usable by the system 100 such as computers, sensors, displays/screens, speakers, and virtually any other device that can be beneficial in conjunction with providing the user 90 with a media experience 800. As listed in Table 1, the operating environment 80 can include a wide variety of power sources 81, data sources 82 (such as a media player 130 playing the media content 800), screens/displays 110, speakers 120, and computers 132.

D. Ports

A connection for transmitting power and/or data can exist between two or more ports 500. Ports 500 can be wired and/or wireless. Typically the transmission of power/electricity requires a wired port 500. Wireless ports 500, which are often referred to as wireless adaptors are increasingly utilized to provide video and other types of media content 800. However, a cord 600 such as an HDMI cord 600 is still typically required in many contexts for high quality video content.

The system 100 provides users 90 with the ability to connect a portable access device 150 to one or more ports 500 in the media chair apparatus 200 and to connect one or more ports 500 in the media chair apparatus 200 to one or more ports 500 in the operating environment 80. Thus media content 800 as well as electrical power and other types of inputs can be delivered to the portable access device 150. The media chair apparatus 200 can provide a valuable tool for managing the various cords 600 used to supply data and power to the portable access device 150.

As listed on Table 1, ports 500 can be differentiated based on distinctions that include wired/wireless, environment/user, and power/data/combination.

E. Cords

A cord 600 is a wired connection between two ports 500. It is anticipated in many contexts that a user 90 will find it desirable to deliver power from a cord 600 connecting a power source in the operating environment 80 to the media chair apparatus 200 while another cord 500 delivers power from the media chair apparatus 200 to the portable access device 150.

The media chair apparatus 200 can be implemented to include a wide variety of potential useful devices that provide users 90 with a useful interface for accessing media content 800. However, the original motivation for conception of the media chair apparatus 200 was to facilitate the management of various cords 600 while still allowing the user 90 to enjoy rotational movement of the media chair apparatus 200.

As listed on Table 1, cords 600 can be differentiated based on distinctions that include wired/wireless, environment/user, and power/data/combination.

F. Portable Access Device

A portable access device 150 is a portable device that is used by user 90 to engage in the media experience 800. Although it is possible that a portable access device 150 can be seen or otherwise used by more than one user 90 at a time, a portable access device 150 is intended for personal use one user 90 at a time. Examples of portable access devices 150 include but are not limited to smart phones, tablet computers, laptop computers, notepad computers, portable disc players, MP3 players, watch computers, headphones, visors, and VRD visors.

It is anticipated that many portable access devices 150 will be wearable devices such as visors or VRD visors worn on the head of the user 90. Such wearable devices can provide a high quality display to the user 90 very close to the eyes of the use 90. In the case of VRD visors, the displayed images are projected onto the eyes of the user 90.

As listed on Table 1, portable access devices 150 can include wearable access devices such as visors, VRD visors, and headphones/earphones.

G. Media Chair Apparatus

The media chair apparatus 200 can function as a useful interface between the user 90 and the system 100 as well as between the portable access device 150 and the user 90. The media chair apparatus 200 is comprised of a seat assembly 300 that provides for seating the user 90 and a support assembly 400 that provides for supporting the seat assembly 300. The various assemblies can be implemented in a wide variety of different ways, possessing a variety of different components capable of providing a variety of different functions.

The original conception of the media chair apparatus 200 was intended to facilitate the ability of user 90 occupying the media chair apparatus 200 to engage in substantial rotational movement without tangling various cords 600.

One or more cords 600 connecting the media chair apparatus 200 to the operating environment 80 can be connected to a port 500 in the support assembly 400. The support assembly 400 can be a least temporarily fixed into a substantially stationary position. Rotation of the seat assembly 300 will not tangle the cords 600 connecting the operating environment 80 to the support assembly 400. Nor will rotation of the seat assembly 300 tangle cords 600 between the seat assembly 300 and the portable access device 150 since the portable access device 150 rotates along with the seat assembly 300 and the user 90.

By arranging the cords 600 and ports 500 such that cords 600 connecting the media chair apparatus 200 are connected to the non-rotating support assembly 400 and cords 600 connecting the portable access device 150 to the media access chair 200 are connected to the seat assembly 200, the media chair apparatus 200 facilitates the ability of the user 90 to spin around in the media chair apparatus 200 without tangling the cords 600 connecting the operating environment 80 to the media chair apparatus 200. Such cords 600 can be used to deliver electricity and/or data (such as the media content 800 itself), to the media chair apparatus 200. One or more cords 600 connecting the portable access device 150 to the seat assembly 300 can thus be used to deliver electricity and/or data (such as the media content 800 itself), to the portable access device 150 and the user 90.

Figure 1B:
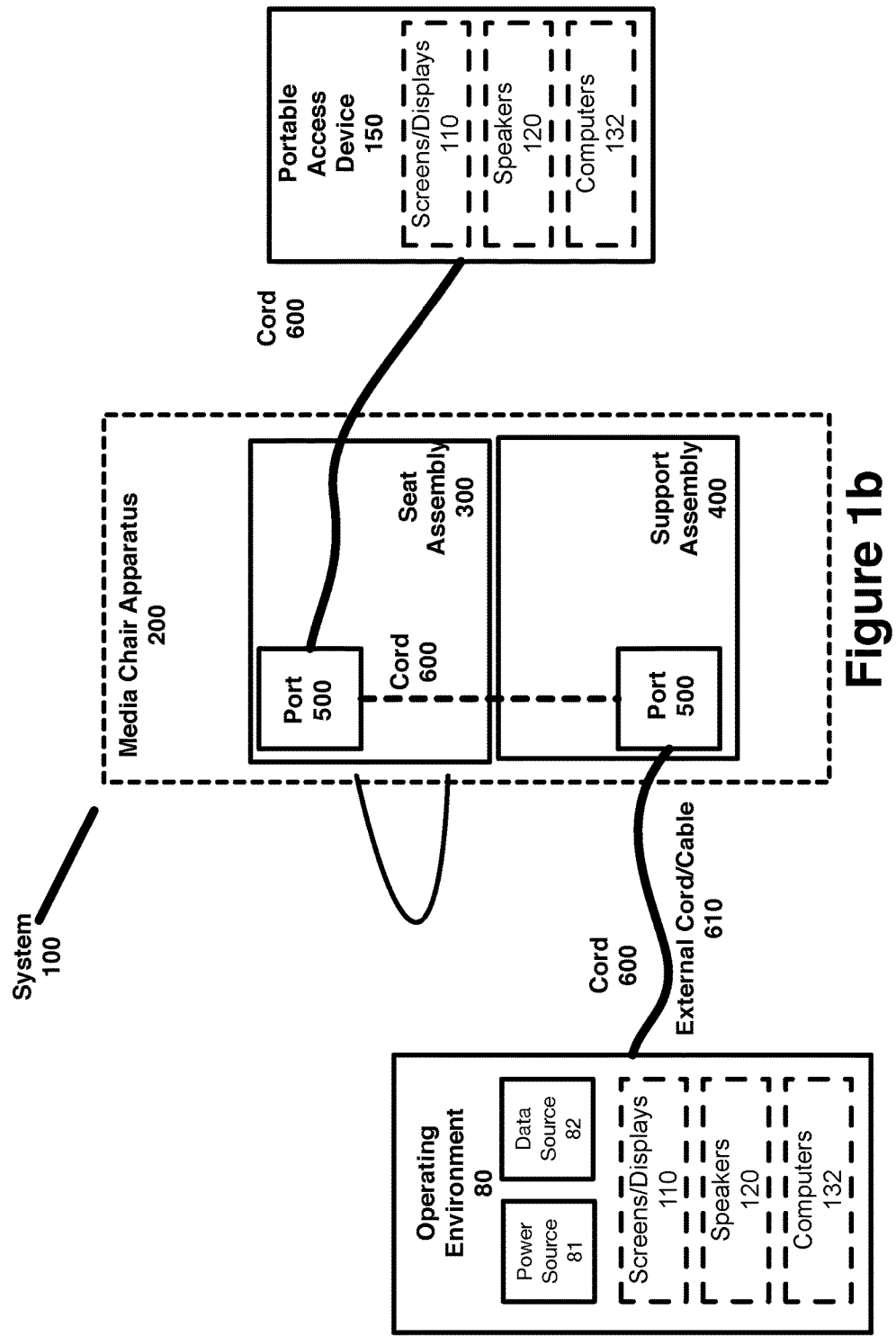
FIG. 1b is a block diagram illustrating an example of a media chair apparatus comprised of a rotatable seat assembly connected by a cord to a portable access device and an at least temporarily stationary support assembly connected by a cord to an operating environment.

FIG. 1b is a block diagram illustrating an example of a media chair apparatus 200 comprised of a rotatable seat assembly 300 connected by a cord 600 to a portable access device 150 and an at least temporarily stationary support assembly 400 connected by a cord 600 to an operating environment 80. One or more cords 600 connecting the port 500 in the seat assembly 400 to the operating environment 80 can draw electrical power and/or data (such as the media content 800) to the media chair apparatus 200. One or more internal cords 600 can connect the port 500 in the at least temporarily non-rotating support assembly 400 to a port 500 in the fully rotatable seat assembly 300. One or more external cords 600 can connect the port 500 in the seat assembly 300 to the portable access device 150 utilized by the user 90 in accessing the media content 800. FIG. 1b illustrates a chain of connections comprising of three links: (1) an operating environment 80 connected to a support assembly 400 by a cord 600 that is external to the media chair apparatus 200; (2) a support assembly 400 connected to seat assembly 300 by a cord 600 that is internal to the media chair apparatus 200; and (3) seat assembly 300 connected to a portable access device 150 by a cord 600 that is external to the media chair apparatus 200.

These three links facilitate the ability to deliver electrical power and/or data (such as the media content 800) from the operating environment 80 to the portable access device 150 while at the same time enabling the user 90 to spin around freely in the seat assembly 300.

As illustrated in FIG. 1b, the seat assembly 300 can be configured to rotate freely. In some embodiments, the rotational capability is unlimited. In other embodiments, the rotational capability may be limited to more than about 720 degrees or more than about 360 degrees. In contrast to the seat assembly 300, the support assembly 400 can be configured to be at least temporarily fixed into its position while the seat assembly 300 rotates. This is useful because any movement by the support assembly 400 could tangle cords 600 connecting the support assembly 400 to the operating environment 80.

II. Interactions Between Components

The system 100 provides for using the media chair apparatus 200 as an interface for at least some of the interactions between the user 90 and the operating environment 80 and at least some of the interactions between the portable access device 150 and the operating environment 80. In some embodiment of the system 100, all inputs and outputs from the operating environment 80 that are directed towards the user 90 and/or the portable access device 150 are directed through the media chair apparatus 200. In other embodiments, the user 90 and/or the portable access device 150 have some direct interactions with the operating environment 80.

A. Media Chair Apparatus as an Interface

FIGS. 2a-2d can be differentiated on the basis of whether the media chair apparatus 200 is the exclusive interface between the user 90 and the operating environment 80 and/or between the portable access device 150 and the operating environment 80.

1. Media Chair Apparatus as an Exclusive Interface

FIG. 2a is a block diagram illustrating an example of different interactions between system 100 components. In FIG. 2a, the media chair apparatus 200 is the exclusive interface between the operating environment 80 and both the user 90 and the portable access device 150. All inputs and outputs run through the media chair apparatus 200. All interactions are done through the media chair apparatus 200.

2. Media Chair Apparatus as Non-Exclusive Interface

FIG. 2b is a block diagram illustrating an example of different interactions between system 100 components. In FIG. 2b, the both the user 90 and the portable access device 150 have some direct interactions with the operating environment 80. By way of example the portable access device 150 may directly access a wireless network in the operating environment 80 and the operating environment 80 may include a microphone for receiving voice commands.

3. Exclusivity for Users but not Portable Access Devices

FIG. 2c is a block diagram illustrating an example of different interactions between system 200 components. In FIG. 2c, the portable access device 150 has some direct interactions with the operating environment 80 while the user 90 does not.

4. Exclusivity for Portable Access Devices but not Users

FIG. 2d is a block diagram illustrating an example of different interactions between system components. In FIG. 2d, the user has some direct interactions with the operating environment, but the portable access device does not.

B. Different Locations of the Media Player

The media chair apparatus 200 can be implemented in a wide variety of different ways. Users 90 possess a wide variety of different ways to access media content 800. The system 100 can be implemented in such a manner as to accommodate the wide variety of different ways that users 90 want to engage in media experiences 80. Different types of media players 130 playing different types of media content 800 can be implemented in different ways into the system 100. FIGS. 2e-2g illustrate different placement of media players 130 within the system 100. Although FIGS. 2e-2g are examples of the media chair apparatus 200 serving as an exclusive interface, the examples of FIGS. 2e-2g can be readily applied to the different exclusivity relationships illustrated in FIGS. 2a-2d.

1. Media Player in Operating Environment

FIG. 2e is a block diagram illustrating an example of different interactions between system 100 components. In FIG. 2e, the media chair apparatus 200 is the exclusive interface for both the user 90 and the portable access device 150 (consistent with FIG. 2a) and the media player 130 is within the operating environment 80.

By way of further example, the portable access device 150 could be a VRD visor that projects images directly onto the retina of the user 90. Power for the VRD visor can be directed from the operating environment 80 through the media chair apparatus 200 to the VRD visor. The content being displayed to the user 90 can originate from a DVD or BLU-RAY disc player that is separate from the media chair apparatus 200 and the portable access device 150.

2. Media Player in Media Chair Apparatus

FIG. 2f is a block diagram illustrating an example of different interactions between system 100 components. In FIG. 2e, the media chair apparatus 200 is the exclusive interface for both the user 90 and the portable access device 150 (consistent with FIG. 2a) and the media player 130 is within the media chair apparatus 200. The media player 130 can be either temporarily or permanent embedded in the media chair apparatus 200.

3. Media Player in Portable Access Device

FIG. 2g is a block diagram illustrating an example of different interactions between system 100 components. In FIG. 2e, the media chair apparatus 100 is the exclusive interface for both the user 90 and the portable access device 150 (consistent with FIG. 2a) and the media player 130 is within the portable access device 150. By way of example, the portable access device 150 could be a smart phone playing a song or a video. In the context of a portable access device 150 in the form of a visor such as a VRD visor, the visor can include the functionality of a media player 130 in addition to the functionality of communicating the media experience 800.

III. Method of Engaging in a Media Experience

The invention can be described and expressed in terms of a media chair apparatus 200, a system 100 that includes a media chair apparatus 200, as well as a method for engaging in media content 800.

Figure 3:
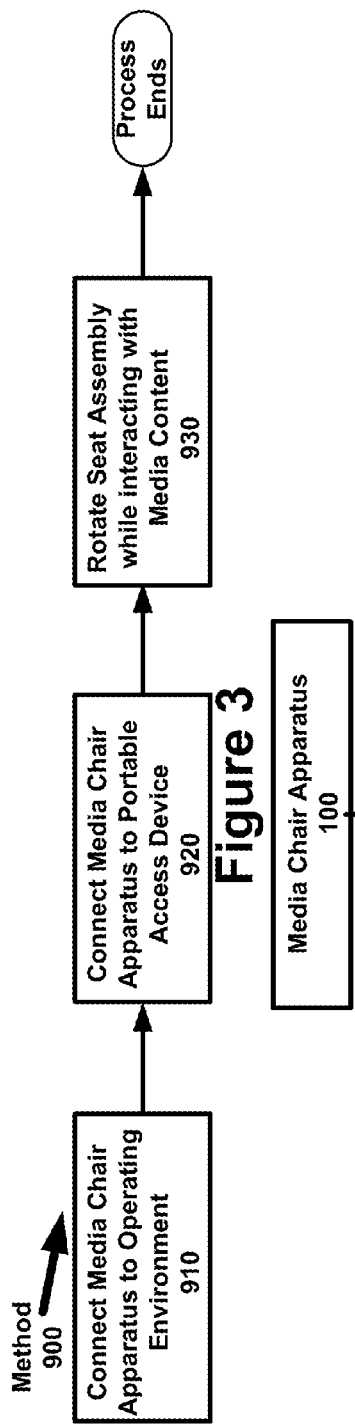
FIG. 3 is a flow chart diagram illustrating an example of a method for engaging in a media experience.

FIG. 3 is a flow chart diagram illustrating an example of a method 900 for engaging in a media experience 800.

At block 910, the media chair apparatus 200 is connected to the operating environment 80. This can be done using one or more ports 500 in the operating environment 80 and one or more ports on the support assembly 400. The ports 500 can be wireless ports or wired ports.

At block 920, the media chair apparatus 200 is connected to the portable access device 150. This can be done using one or more ports 500 in seat assembly 300 and one or more ports in the portable access device 150. The ports 500 can be wireless ports or wired ports. The ports 500 in the support assembly 400 can be connected to the corresponding ports 500 in the seat assembly 300 through wired or wireless means.

At block 930, the user 90 can rotate while seated in the media chair apparatus 200 without tangling any external cords 600. The seat assembly 300 rotates with respect to the support assembly 400, which is at least temporarily and substantially fixed into a non-moving position.

IV. Media Chair Apparatus

The media chair apparatus 200 is an interface between the user 90 and the operating environment 80 of the media chair apparatus 200. The media chair apparatus 200 can be implemented in a wide variety of shapes and configurations. FIG. 1b, discussed above, illustrates a template embodiment of the media chair apparatus 200 that can be implemented in a variety of different ways using a variety of different component. Table 1 lists a variety of different components that can be included in the seat assembly 300 and the support assembly 400. Table 1 also lists a variety of different types of ports 500, cords 600, portable access devices 150, and components within the operating environment 80 of the media chair apparatus 200.

Figure 4A:
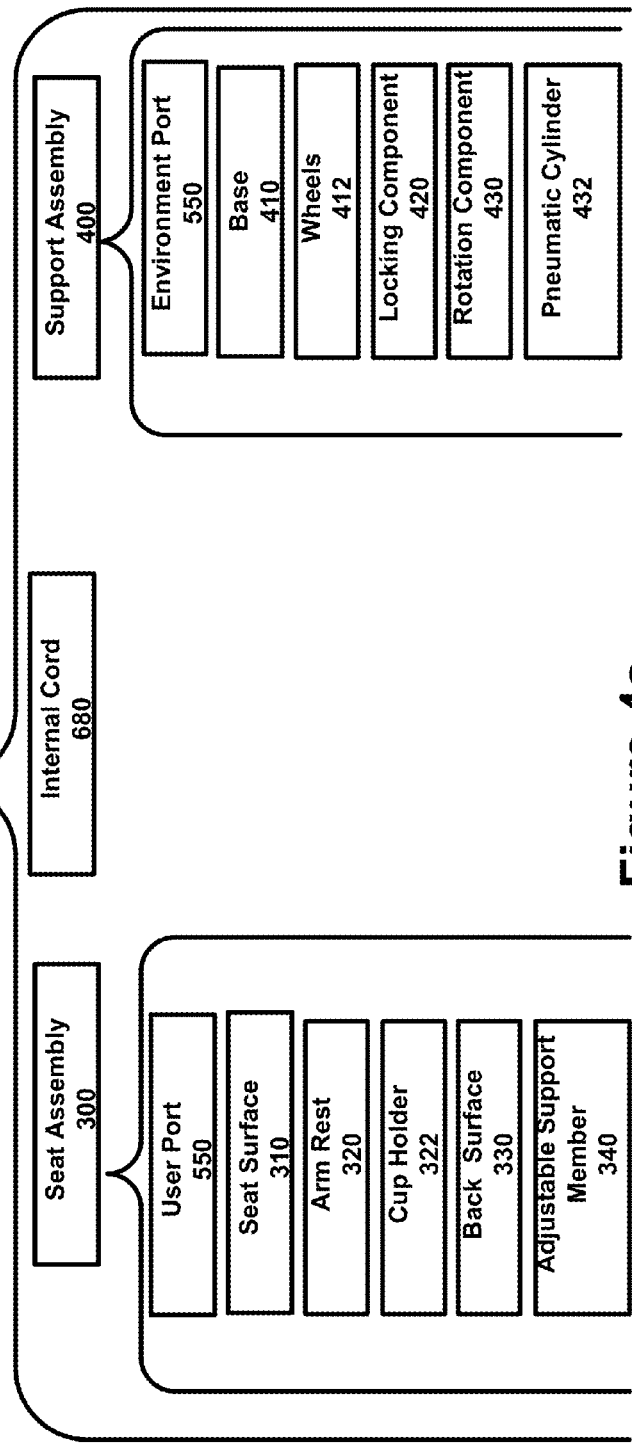
FIG. 4a is a block diagram illustrating an example of some of the components that can be included in the media chair apparatus.

FIG. 4a is a block diagram that illustrates an example of different components that can comprise the media chair apparatus 200. There are a variety of different components that are common in conventional chairs that can be included in the media chair apparatus 200. Components such as casters, bellows, cushions, cylinders (including pneumatic cylinders), seat plates, lumbar support components, arm brackets, arm pads, task chair controllers, wheels, and other components known in the art can be included in the media chair apparatus 200.

The media chair apparatus 200 enables the user 90 to sit on the media chair apparatus 200 while engaging in a media experience 800. The media chair apparatus 200 can serve as an interface between an operating environment 80 in which the media chair apparatus 200 is located and the user 90. The media chair apparatus 200 can also serve as an interface between a portable access device 150 and the operating environment 80.

A. Components of the Media Chair Apparatus

As illustrated in FIG. 4a, the media chair apparatus 200 can be comprised of a seat assembly 300, a support assembly 400, and one or more internal cords 680 connecting one or more ports 500 in the seat assembly 300 to one or more ports 500 in the support assembly 400.

1. Seat Assembly

The seat assembly 300 is the portion of media chair apparatus 200 upon which the user 90 sits. The seat assembly 300 is the portion of the media chair apparatus 200 The seat assembly 550 can include one or more user ports 550 (ports 500 positioned in the seat assembly 300 that are intended for connection with the portable access device 150), a seat surface 310, an arm rest 320, a cup holder 322, a back surface 330, and an adjustable support member 340.

a. User Port

As indicated in Table 1, user ports 550 can be user power ports (delivering electricity), user data ports (communicating data), and/or user combination ports (transferring both power and data). As is also indicated in Table 1, ports 500 can be wired ports or wireless ports. A user port 550 is a port 500 that is designed for use by the portable access device 150 of the user 90.

b. Seat Surface

A seat surface 310 is what the user 90 sits on in the seat assembly 300. Seat surfaces 310 can be supported with lumbar support, springs, and other mechanisms which mitigates against the weight of any portable access device 150 held or worn by the user 90.

c. Arm Rest

An arm rest 320 is an optional component of the seat assembly 300. It can however be a useful component in that it can provide comfort to the user 90, as well as provide a convenient location for one or more user ports 550. In some embodiments, an adjustable support member 340 may also be implemented with the specific arm rest 320 in mind.

d. Cup Holder

Some arm rests 320 can include cup holders 322 and other cavities for containing food/beverages, portable access devices 150 such as a smart phone, and other items useful and convenient for users 90.

e. Back Surface

A back surface 330 is an optional component of the seat assembly 300, but it can both comfort the user 90 as well as facilitate the safety of the user 90 when a user 90 is spinning in the seat assembly 300. The back surface 330 can include a lumbar support component.

f. Adjustable Support Member

Portable access devices 150 such as smart phones, tablet computers, laptop computers, and wearable access devices such as visors and VRD visors have mass/weight. Portable access devices 150 that are not wearable access devices can be bulky to support even when such devices are very light. Anyone who has tried holding up a tablet computer or smart phone for an extended period of time can confirm such a conclusion.

An adjustable support member 340 can remedy the issues of bulkiness and weight by supporting the portable access device 150. Adjustable support members 340 can be implemented in a wide variety of different ways, using the adjustable mechanisms that one can find in desk lamps, and other similar devices.

The adjustable support member 340 can essentially render the portable access device 150 weightless. Portable access devices 150, whether large laptops, a small smartphone, or even in the form of a wearable access device such as a visor, can benefit from the structural support of an adjustable support member 340.

2. Internal Cords

The media chair apparatus 200 facilitates rotational movement by configuring in wired connections with the operating environment 80 through an environment port 510 located in the support assembly 400 and wired connections with the portable access device 150 through a user port 550 located in the seat assembly 500. Connecting the one or more user ports 550 in the seat assembly 300 and the one or more environment ports 510 are one or more internal cords 680.

One or more internal cords 680 connect the one or more ports 500 in the support assembly 400 (also referred as to environment ports 510) to the one or more ports 500 in the seat assembly 300 (also referred to as user ports 550). The configuration of an environment port 510 connected to a user port 550 through an internal cord 680 allows the user port 550 in the seat assembly 300 to provide the portable access device 150 with needed connections while also permitted the rotation of the seat assembly 300 without tangling the cord(s) 600 connecting the operating environment 80 to the environment port 510.

From an external standpoint, there are two linkages between the operating environment 80 and the portable access device 150. Such linkages can be used to deliver power, data (including media content 800), or both. Those externally visible linkages are: (1) the operating environment 80 and the media chair apparatus 200; and (2) the media chair apparatus 200 and a portable access device 150 used by the user 90 in engaging in the media experience 800.

Connecting those two linkages is a third linkage that is not outwardly visible, the internal cord(s) 680 connecting the port(s) 500 on the support assembly 400 to the port (2) on the seat assembly 300.

Ports 500 can be used to transmit electrical power as well as media content 800. No internal cord 680 is required when wireless transmission between ports 500 is sufficiently reliable and efficient. While there have been many impressive developments in wireless technology, power transmission in particular typically requires a wired connection.

3. Support Assembly

The support assembly 400 supports the mass of the seat assembly 300 and the mass of the user 90 seated on the seat assembly 300. Some embodiments of the support assembly 400 provide users 90 with the ability to move the media chair apparatus 200. However, even such embodiments can include a capability for at least temporarily fixing the position of the support assembly 400 to support the desired rotational capability in the seat assembly 300.

a. Environment Port

A port 500 in the support assembly 400 intended for use in connecting with the operating environment for electricity, data, or both can be referred to as an environment port 550. The environment port 550 can connect to the operating environment 80 through one or more cords 600. Since the support assembly 400 provides for being at least temporarily locked into a substantially fixed/non-moving position, rotational movement by the user 90 in the seat assembly 400 does not tangle the cords 600 connecting the environment port 550 to the operating environment 80. As set forth in Table 1, environment ports 550 can include environment power ports, environment data ports, and environment combination ports. Cords 600 connecting to the environment port 550 are typically removable external cords 610. Such cords 610 can include but are not limited to power cords, data cords, and combination cords. Examples of common cord 600 that can be used with the environment port 610 include but are not limited to USB cords, Ethernet cords, HDMI cords, and Coaxial cables.

b. Base

A base 410 is the portion of the support assembly 400 that comes into contact with the operating environment 80. The base 410 is typically the bottom-most section of the support assembly 400, which is typically positioned vertically beneath the seat assembly 300. However, some embodiments of the media chair apparatus 200 can involve a base 410 positioned at the top of the support assembly 400 with the support assembly 400 positioned vertically above the seat assembly 300. See FIG. 4d.

c. Wheels

Some embodiments of the support assembly 400 can include one or more wheels 412 to enable users 90 to more easily move the media chair apparatus 200. Such embodiments can include a locking component 420 to prevent the movement of the wheels 412 when the user 90 desires to rotate the seat assembly 300 and keep the support assembly 400 at least temporarily in a substantially non-moving state.

d. Locking Component

A locking component 420 can be used to at least temporarily prevent movement of the support assembly 400. In some embodiments, the locking component 420 is the capability to raise the wheels 412 above the surface of the operating environment 80. In other embodiments, the locking component 420 can be one of variety of known "parking brake" type mechanisms known the prior art of office chairs.

e. Rotation Component

A mechanism or combination of mechanisms that enables the seat assembly 300 to rotate relative to the support assembly 400. In many embodiments, the rotation component will involve a cylindrically shaped structure upon which the seat assembly 300 can rotate. In many embodiments, any internal cords 680 are run up through the rotation component 320. A particularly desirable type of rotation component 430 may be a pneumatic cylinder 432. A variety of different rotation components 430 are known in the prior art of chairs, particularly in the context of modern office furniture.

f. Pneumatic Cylinder

A type of rotation component 430 in which compressed gas such as air is used to produce force in a reciprocating linear motion.

B. Geometric/Design Variations

The media chair apparatus 200 can be implemented in a wide variety of different designs and component configurations.

FIG. 4a

FIG. 4b is a diagram illustrating an example of a front view of a media chair apparatus 200 that is very similar to the illustration in FIG. 4a.

FIG. 4c is a diagram illustrating an example of a front view of a media chair apparatus.

FIG. 4d is a diagram illustrating an example of a front view of a media chair apparatus.

V. Additional Functionality

The core function of the media chair apparatus 200 is to provide one or more ports 500 as a convenient interface for one or more cords 600. The media chair apparatus 200 can help users 90 manage their cords 600 while facilitating the ability of the user 90 to spin around in the media chair apparatus 200. At this core-level of functionality, the media chair apparatus 200 serves as a convenient interface for cords 600 and ports 500 between the user 90 and the surrounding operating environment 80.

Figure 5:
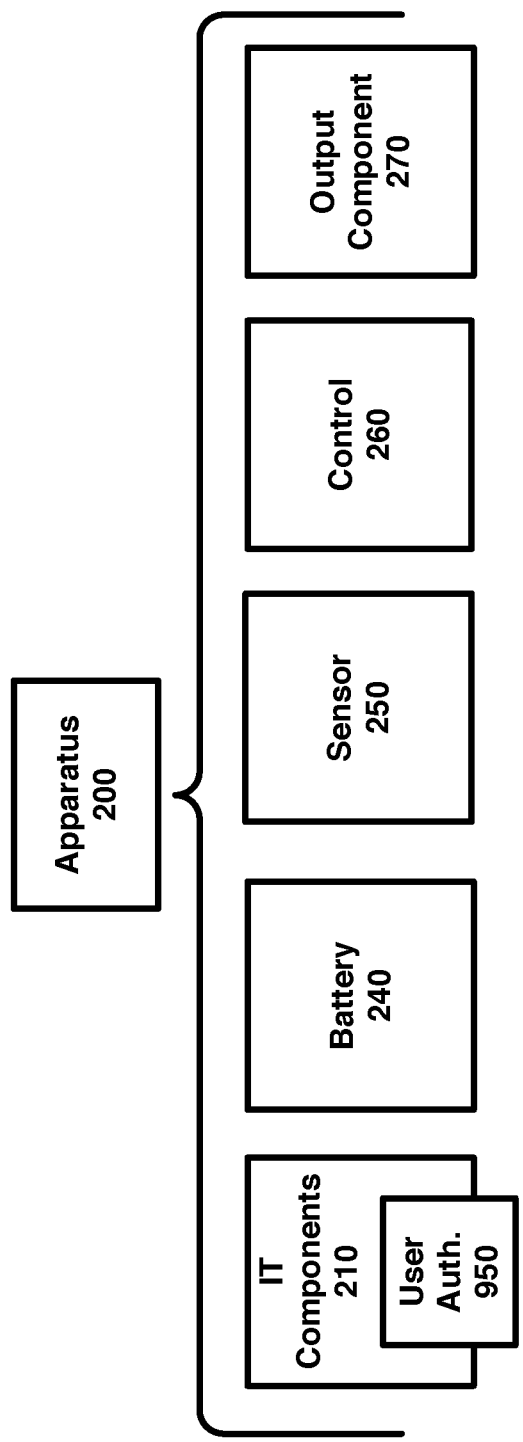
FIG. 5 is block diagram illustrating an example of different optional components that can be incorporated into the media chair apparatus.

Additional components can be either temporarily or permanent embedded in to the media chair apparatus 200, expanding the function and value of the media chair apparatus 200. FIG. 5 is a block diagram illustrating some examples of various components that can be added to the media chair apparatus 200.

A. IT Components

A variety of IT components 210 can be added to the media chair apparatus 200, making it a smart chair in ways analogous to the enhanced functionality of a smart phone in contrast to a conventional cellular phone. As listed on Table 1, IT components 210 may include elements such as computers, storage components such hard drives, and databases. The media chair apparatus 200 can also be configured to include the media player 130.

Users 90 can benefit from expanding the scope of the interface between user 90 and system 100 that is provided by the media chair apparatus 200. The various IT components 210 can help make the media chair apparatus 200 provide an almost virtual reality experience for users 90 engaging in media content 800.

B. Battery

As illustrated in FIG. 5, some embodiments of the media chair apparatus 200 can include a battery 240. A wide variety of different batteries 240 can be included in different embodiments of the media chair apparatus 200. Whether the purpose of the battery 240 is provide emergency backup power for the portable access device 150 or to at least temporarily eliminate the need for any external power sources, the addition of a batter 240 can benefit users 90 in many different contexts.

C. Sensors

As illustrated in FIG. 5, some embodiments of the media chair apparatus 200 can include one or more sensors 250. As listed in Table 1, potential sensors 250 can include visual sensors (which can also be referred to as cameras), retina sensors that provide for capturing a retina scan of the user 90, fingerprint sensors that provide for capturing a fingerprint of the user 90, motion sensors that detect the movement of the media chair apparatus 200, position sensors that detect the position of the media chair apparatus 200, and acoustic sensors (which can also be referred to as microphones) for detecting and/or capturing sound.

Sensors 250 can transform the media chair apparatus 200 into a two way interface between the user 90 and the media chair apparatus 200 (including system 100 components downstream, such as the media experience 800 itself).

Sensors 250 can help enable the media chair apparatus 200 to provide an interactive media experience 800. Sensors 250 in the media chair apparatus 200 or elsewhere in the system 200 can help allow the user 90 to engage in a media experience 800 that approximates virtual reality.

Sensors 250 on the media chair apparatus 200 can be used to identify and/or authenticate the identity of users 90. The IT components 210 of media chair apparatus 200 can provide authentication, enabling the media chair apparatus 200 to serve as an interface for any applications that involve passwords or other forms of user authentication.

D. Controls

As illustrated in FIG. 5, one or more controls 260 can be included as part of the media chair apparatus 200. A control 260 is similar to a sensor 250 in that both provide for receiving inputs from the user 90 and the operating environment 80 of the user 90. A control 260 is an explicit mechanism by which the user 90 sends an explicit instruction the media chair apparatus 200, the media player 130, or some other component of the system 100. A sensor 250 detecting a certain condition may trigger the same result, but sensors 250 can capture data that is analyzed, modeled, etc. for the purposes of triggering automated processing.

As listed in Table 1, examples of controls 260 include but are not limited to buttons, joysticks, trackpads, trackballs, mice, and keypads/keyboards.

Controls 260 can transform the media chair apparatus 200 into a two way interface between the user 90 and the media chair apparatus 200 (including system 100 components downstream, such as the media experience 800 itself).

Controls 260 can help enable the media chair apparatus 200 to provide an interactive media experience 800. Controls 260 in the media chair apparatus 200 or elsewhere in the system 200 can help allow the user 90 to engage in a media experience 800 that approximates virtual reality.

E. Output Components

Sensors 250 and controls 260 can be collectively referred to as input components. They provide a way for the media chair apparatus 200 to receive feedback (whether in the form of express instructions or observations). In contrast, output components 280 are devices that transmit feedback/communication to the user 90 instead of receiving information from the user 90).

Potential output components 270 are listed in Table 1. Output components 270 can include but are not limited to speakers that transmit sound, displays that transmit visual information, haptic feedback mechanisms, and even motors that can trigger the motion/change in position of the media chair apparatus 200.

Output components 270 can help enable the media chair apparatus 200 to provide an interactive media experience 800. Output components 270 can help enable the media chair apparatus 200 to provide an interactive media experience 800. Output components 270 in the media chair apparatus 200 or elsewhere in the system 200 can help allow the user 90 to engage in a media experience 800 that approximates virtual reality.

VI. Alternative Embodiments

No patent application can expressly disclose in words or in drawings, all of the potential embodiments of an invention. In accordance with the provisions of the patent statutes, the principles and modes of operation of the system are explained and illustrated in certain preferred embodiments. However, it must be understood that the system may be practiced otherwise than is specifically explained and illustrated without departing from its spirit or scope.

The description of the system provided below should be understood to include all novel and non-obvious combination of elements described herein, and claims may be presented in this or a later application to any novel non-obvious combination of these elements. Moreover, the foregoing embodiments are illustrative, and no single feature or element is essential to all possible combinations that may be claimed in this or a later application. The capability of modifying images in accordance with a right/left differential can be implemented using a wide variety of different technologies and components.

The system 100 is a media delivery system that includes a media chair apparatus 200 and other components. The system 100 can be configured in a wide variety of different ways.

A. Operating Environment

As listed in Table 1, the operating environment 80 for the system 100 can include a wide variety of different components. Many embodiments of the system 100 can be motivated by a "plug and play" approach to media experiences, allowing different components to be integrated into the system 100. The operating environment 80 can include a wide variety of different power sources 81 and data sources 82. The data sources 82 can include the media player 130 that play the media content 800. The operating environment 80 can also include screens/displays 110, speakers 120, and computers 132.

B. Portable Access Devices

As listed in Table 1, there are a wide variety of different portable access devices 150 that can benefit from the functionality and convenience of the media chair apparatus 200. Portable access devices can include but are not limited to laptop computers, notepad computers, tablet computers, smart phones, MP3 players, portable DVD/BLU-RAY players, and wearable access devices. Wearable access devices can include but are not limited to visors such as VRD visors, smart watches, and headphones/earphones. In some embodiments, media players 130 are portable access devices 150.

C. Ports

As listed in Table 1, there are a wide variety of different ports 500 that can be incorporated into the system 100. Ports 500 can be wired ports or wireless ports (which can also be referred to as wireless adaptors). Ports 500 can be used to connect for the purposes of transmitting power (power port), data (data port), or combinations of power and data (combination port).

Ports 500 can be delineated with respect to the media chair apparatus 200 on the basis of whether the port 500 is intended for interaction with the operating environment (an environment port 510) or portable access devices 150 (a user port 580). An environment power port is both an environment port 510 and a power port. An environment data port is both an environment port 510 and a data port.

A user power port is both a user port 550 and a power port. A user data port is both a user port 550 and a data port. A user combination port is both a user port 550 and a combination port.

D. Cords

As illustrated in Table 1, the system 100 can utilize a wide variety of different cords 600 to connect different ports 500 to each other. Power cords are cords 600 that transmit electricity. Data cords are cords 600 that transmit data, such as a media experience 800. Combination cords are cords 600 that transmit both data and power. Examples of cords 600 include USB cords, Ethernet cords, HDMI cords, and coaxial cables.

Cords 600 that are external to the media chair apparatus 200, such as cords 800 that can be temporarily connected and temporarily removed are external cords 610. An external power cord is both a power cord and an external cord 610. An internal cord 680 is a cord 600 within the media chair apparatus 200 for which the user 90 does not have ready access to add or remove. An internal power cord is both an internal cord 680 and a power cord.

E. Media Content

A media experience 800 is derived from the playing of media content 800 on a media player 130. In many instances a media experience 800 will include audio attributes and/or visual attributes such as video attributes. Some embodiments of media content 800 will include tactile attributes, olfactory attributes, and/or gustatory attributes.

VII. Glossary/Index of Elements

Table 1 below sets forth a chart of element numbers, element names, and element definitions/descriptions used in the Figures and throughout the text of the Detailed Description section.

Table 1 below sets forth a list of element numbers, names, and descriptions/definitions.

| # | Name | Description |
|---|---|---|
| 80 | Operating Environment | The surroundings encompassing the media chair apparatus 200. An example of an operating environment 80 is a room in which the media chair apparatus 200 is located. In many instances, the media experience 800 is provided by a media player 130 positioned within the operating environment 80 of the media chair apparatus 200. In many contexts of the system 100, the operating environment 80 will contain a power source 81 used to provide the media experience 800 and a data source 82 used to provide some or all of the media experience 800. |
| 81 | Power Source | A source of electricity used to deliver electricity to an environment port 510 of the media chair apparatus 200. Common examples of a power source 81 include a conventional power outlet or a battery. |
| 82 | Data Source | A source of data in the operating environment. In many embodiments of the system 1000, the media player 130 is not the media chair apparatus 200 and is not the portable access device 150, and is instead found in the operating environment 80 of the media chair apparatus 200. |
| 90 | User | A human being engaging in a media experience 800 while seated on the media chair apparatus 200. |
| 100 | System | An assemblage of components and processes that in the aggregate perform the function of delivering a media experience 800 to a user 90 seated in a media chair apparatus 200. The system 100 can include but is not limited to the media chair apparatus 200, components within the operating environment 80 such as a power source 81 and/or data source 82, a portable access device 150, and one or more cords 600 connecting the operating environment 80 to the media chair apparatus 200 or the media chair apparatus 200 to the portable access device 150. |
| 110 | Screen/Display | A device that communicates the visual attributes of media content 800. In many contexts, the portable access device 150 will include a screen/display 110. In some embodiments of the system 100, the screen/display 110 can be part of the operating environment 80 or even a component of the media chair apparatus 200. For example, the operating environment 80 of the system 100 can include a television set or computer monitor. |
| 120 | Speakers | A device that communicates the acoustic attributes of media content. In many contexts, the portable access device 150 will include one or more speakers. In some embodiments of the system 100, speakers 120 can be part of the operating environment 80 or even a component of the media chair apparatus 200. |
| 130 | Media Player | A device that "plays" the media content 800 that is delivered to the user 90. Examples of media players 130 can include but are not limited to DVD players, BLU-RAY players, audio CD players, cable boxes, general purpose computers playing content through online streaming, and general purpose computers playing content by accessing a source file. In many contexts, the portable access device 150 is the media player 130. In other embodiments, the media player 130 is located somewhere in the operating environment 80 of the media chair apparatus 200 or even within the media chair apparatus 200 itself. |

-continued

| # | Name | Description |
|---|---|---|
| 132 | Computer | A category of media player 130. Computers 132 can include smart phones, smart watches, tablet computers, desktop computers, laptop computers, embedded computers, and general purpose computers. Some embodiments of a visor or VRD visor can include a computer 132. Some embodiments of a media chair apparatus 200 can include a computer 132 embedded within the media chair apparatus 200. |
| 150 | Portable Access Device | A device through which a user 90 accesses the media experience 800. Examples of portable access devices 150 can include but are not limited to smart phones, smart watches, tablet computers, visors, VRD visors and headphones/earphones. |
| | Wearable Access Device | A portable access device 150 that is worn by a user 90. Visors and VRD visors are examples of wearable access devices. |
| | Visor | A category of wearable access devices where the device or at least one component of the device is worn on the head of the user 90. Visors can communicate audio attributes, visual attributes, and/or potential other attributes of media content 800 |
| | VRD Visor | A VRD visor is a type of visor. VRD stands for a virtual retinal display. VRDs can also be referred to as retinal scan displays ("RSD") and as retinal projectors ("RP"). VRD projects the image directly onto the retina of the eye of the viewer. |
| | Headphones/ Earphones | A category of wearable access device to delivers audio attributes of media content 800. |
| 200 | Media Chair Apparatus | A device on which a user 90 can sit while enjoying a media experience 800. The media chair apparatus 200 can be comprised of a seat assembly 300 on which the user 90 sits, and a support assembly 400 that supports the seat assembly 300. The |
| 210 | IT Components | Information technology components that can be incorporated into the media chair apparatus 200. Examples of IT components include computers, storage components, and databases. |
| | Computer | A computer processor that provides for implementing a computer program. Computers include general purpose computers as well as special purpose computers. |
| | Storage Component | A mechanism for storing data, such as a hard drive or optical disc. |
| | Database | A computer program that organizes data on the storage component. There are a wide variety of different types of commercially available databases that can be incorporated into the media chair apparatus 200. |
| 240 | Battery | A power source that can be embedded within the media chair apparatus 200. |
| 250 | Sensor | A device that captures information. Some embodiments of the system 100 may include one or more sensors 250 used by the system 100 to capture information about the user 90, the operating environment 80 in which the media chair apparatus 200 is being used, the media experience 800 of the user 90, or some aspect of the system 100. In some embodiments of the system 100, information captured by the sensor 250 can impact the media content 800 experienced by the user 90. In some embodiments of the system 100, information captured by a sensor 800 is used to identify/authenticate the identity of the user 90. Information captured by a sensor 250 can be used to selectively influence the system 100 in a variety of highly nuanced ways. The system 100 can include a wide variety of different sensors 250, including but not limited to visual sensors/cameras, retina sensors, fingerprint sensors, motion sensors, position sensors, acoustic sensors/microphones, and heat sensors. |

-continued

| # | Name | Description |
|---|---|---|
| | Visual Sensor/Camera | A sensor 250 that captures information in the form of visual attributes. A visual sensor can also be referred to as a camera. The system 100 can incorporate a wide variety of different cameras, including conventional still frame image cameras as well as conventional video cameras. Some embodiments of cameras may capture sensor readings outside the visible spectrum of light such as infrared or ultraviolet light. Some embodiments of cameras can be designed to operate at high speeds, such as high speed video cameras. |
| | Retina Sensor | A type of visual sensor used to capture an image of a human retina. A retina sensor can also be referred to as a retina scanner. A retina sensor can be used to identify/authenticate the identity of users 90. |
| | Fingerprint Sensor | A type of visual sensor used to capture an image of a fingerprint. A fingerprint sensor can also be referred to as a fingerprint scanner. A fingerprint sensor can be used to identify/authenticate the identity of users 90. |
| | Motion Sensor | A type of sensor 250 used to capture information about the motion of the user 90 and/or the media chair apparatus 200. One of the original motivations for the conception of the media chair apparatus 200 is the ability to enable the user 90 to move while engaging in media content 800. The motion of the user 90, such as the rotational movement of the seat assembly 300 relative to the support assembly 400 can be used to selectively influence the media experience 800 of the user 90. For example, the system 100 can provide 360 degree views of simulated space that a user 90 navigates through rotation of the media chair apparatus 200. Since the user 90 can control the motion of the media chair apparatus 200, the motion sensor can serve as a control 260 in a virtual reality or at least partially interactive media experience 800 in a manner similar to the functionality of a button, joystick, trackpad, trackball, mouse, keypad/keyboard, etc. |
| | Position Sensor | A type of sensor 250 used to capture information about the position of the user 90 and/or the media chair apparatus 200. A type of sensor 250 used to capture information about the position of the user 90 and/or the media chair apparatus 200. One of the original motivations for the conception of the media chair apparatus 200 is the ability to enable the user 90 to move while engaging in media content 800. The position of the user 90, such as the rotational position of the seat assembly 300 relative to the support assembly 400 can be used to selectively influence the media experience 800 of the user 90. For example, the system 100 can provide 360 degree views of simulated space that a user 90 navigates through rotation of the media chair apparatus 200. Since the user 90 can control the position of the media chair apparatus 200, the position sensor can serve as a control 260 in a virtual reality or at least partially interactive media experience 800 in a manner similar to the functionality of a button, joystick, trackpad, trackball, mouse, keypad/keyboard, etc. |
| | Acoustic Sensor/Microphone | A type of sensor 250 that captures information in the form of acoustic/auditory attributes. Acoustic sensors are also commonly referred to as microphones. |
| 260 | Control | A device or component on the media chair apparatus 200 that is used by the user 90 to communicate an instruction to the media chair apparatus 200 or to some other aspect of the system 100, such as a media player 130. Some embodiments of the media chair apparatus 200 include one or more controls 260. Controls 260 can also be referred to as input device 260. Examples of controls 260 include are not limited to buttons, joysticks, trackpads, trackballs, mice, and keypads/keyboards. |
| | Button | A control 260 in the form of a surface or knob that provides for being pressed down. |

-continued

| # | Name | Description |
|---|---|---|
| | Joystick | A control 260 in the form a lever-like switch. |
| | Trackpad | A control 260 in the form of a surface on which the movement of a human finger is used in a manner that is analogous to the movement of a mouse. Tapping the surface of a trackpad is analogous to clicking a mouse. |
| | Trackball | A control 260 comprised of a rolling ball set inside a case. |
| | Mouse | A control 260 in the form of a hand-sized pointing and clicking device. |
| | Keypad/Keyboard | A control 260 comprised of a configuration of buttons associated with a various alpha-numeric characters symbols, and functions |
| 270 | Output Components | A device through which the system 100 communicates with the user 90. Some embodiments of the media chair apparatus 200 can include one or more output components 270. An output component 270 is the opposite of an input component/control 260. Examples of output components 270 include but are not limited to speakers, displays, haptic feedback mechanisms, and a motor in the media chair apparatus 200 that can provide for moving the media chair apparatus 200. |
| | Speaker | An output component 270 that communicates acoustic attributes. Some embodiments of the media chair apparatus 200 can include one or more speakers embedded in the apparatus 200. In other embodiments, the user 90 can utilize speakers in the portable access device 150 or the exterior operating environment 80. |
| | Display | An output component 270 that communicates visual attributes. The display can also be referred to as a screen. In many embodiments of the media chair apparatus 200, the primary display is found in the portable access device 150 or in the exterior operating environment 80 such as a large screen television positioned in front of the media chair apparatus 200. Some embodiments of the media chair apparatus 200 may include a display that is either the primary display or a secondary display for the user 90 occupying the media chair apparatus 200. |
| | Haptic Feedback Mechanism | An output component 270 that communicates through the sense of touch. Haptic feedback mechanisms can be located in a variety of different locations within the media chair apparatus 200 in order to facilitate the delivery of haptic feedback consistent with the media content 800 being accessed by the user 90. |
| | Motor | At output component 270 that communicates through the motion and position of the media chair apparatus 200. Some embodiments of the media chair apparatus 200 provide for communicating motion and/or position information to the user 90 through changes in the position and motion of the media chair apparatus 200. |
| 300 | Seat Assembly | An assembly of components comprising a portion of the media chair assembly 200 that provides for the capability of rotational movement relative to a support assembly 400. The mass of the seat assembly 300 is supported by the support assembly 400. The support assembly 400 is typically positioned beneath the seat assembly 300, but there are embodiments of the media chair apparatus 200 that involve a seat assembly 300 positioned vertically beneath the support assembly 400. The seat assembly 300 can include components including but not limited to one or more seat surfaces 310, one or more arm rests 320, one or more cup holders 322, one or more back surfaces 330, one or more adjustable support members 340, one or more ports 500, one or more additional components 210, one or more sensors 250, one or more controls 260, and/or one or more output components 270. |
| 310 | Seat Surface | A surface on which the user 90 sits while seated on the media chair apparatus 200. |
| 320 | Arm Rest | A mechanism on the seat assembly 300 that provides for supporting an arm of the user 90. Some seat assemblies 300 will not include an arm rest 320. |

| # | Name | Description |
|---|---|---|
| 322 | Cup Holder | A cavity within the seat assembly 300 that provides for holding a container such as a cup. The cup holder 322 is typically located in the arm rest 320. Some seat assemblies 300 will not include a cup holder 322. |
| 330 | Back Surface | A surface in the seat assembly 300 that provides for supporting the back of the user 90 while the user 90 is in a seated position in the media chair apparatus 200. Some seat assemblies 300 will not include a back surface 330. |
| 340 | Adjustable Support Member | A mechanism that is used to support the weight of a portable access device 150, rendering the device essentially weightless. |
| 400 | Support Assembly | An assembly of components comprising a portion of the media chair assembly 400 that provides for supporting the mass of the seat assembly 300 and the relative rotational motion of the seat assembly 300 with respect to the support assembly 400. Some embodiments of the support assembly 400 can provide for the capability of rolling on wheels and rotational movement. However, such embodiments also provide for a parking break mechanism (a locking component 420) to at least temporarily preclude such motion |
| 410 | Base | A component of the support assembly 400 that provides for supporting the support assembly 400 in the operating environment 80 of the media chair apparatus 200. |
| 412 | Wheels | In some embodiments of the support assembly 400, the base includes a configuration of one or more wheels 412 to facilitate the positioning of the media chair apparatus 200. Such embodiments will also typically possess a locking component 420 so that the media chair apparatus 200 can best implement relatively rotational motion for the seat assembly 300 relative to the support assembly 400, which can be at least temporarily placed into a fixed position through the locking of the locking component 420. |
| 420 | Locking Component | A mechanism or configuration of mechanisms used to at least temporarily fix the support assembly 400. Many embodiments of the support assembly 400 can include a parking break mechanism as the locking component 420. |
| 430 | Rotation Component | A mechanism or configuration of mechanisms used to facilitate the rotational movement of the seat assembly 300 relative to the support assembly 400. |
| 432 | Pneumatic Cylinder | An example of a type of rotation component 430. |
| 500 | Port | A data or power connection in the system 100. Ports 500 can provide for wired connections (wired port) as well as wireless connections (wireless port). The media chair apparatus 200 will typically include one or more ports 500 in the support assembly 400 and one or more ports 500 in the seat assembly 300. |
| | Wired Port | A port 500 that provides for wired connections. |
| | Wireless Port/Adaptor | A port 500 that provides for wireless connections. |
| | Power Port | A port 500 that receives/transmits electricity/power. |
| | Data Port | A port 500 that receives/transmits data. |
| | Combination Port | A port 500 that is both a power port 506 and a data port. USB ports are a common example of a combination port. |
| 510 | Environment Port | A port 500 on the media chair apparatus 200 that provides for a connection between the operating environment 80 and the media chair apparatus 200. The environment port 510 is typically located on the support assembly 400 so that the rotation of the seat assembly 300 is not impeded by any cords 600 connecting the environmental port 510 to a port 500 in the operating environment 80. |
| | Power | An environment port 510 that provides for receiving power from the operating environment 80. |
| | Data | An environment port 510 that provides for receiving data from the operating environment 80. Such data can include the media content 800 if the media player 130 is not located on the media chair apparatus 200 or the portable access device 150. |
| | Combination | An environment port 510 that provides for receiving both power and data from the operating environment 80. |

-continued

| # | Name | Description |
|---|---|---|
| 550 | User Port | A port 500 on the media chair apparatus 200 that provides for a connection between the media chair apparatus 200 and the portable access device 150. The user 550 can itself receive power and/or data from the operating environment 80 through the environment port 510. |
| | Power | A user port 550 that provides for delivering power to the portable access device 150. |
| | Data | A user port 550 that provides for delivering data to the portable access device 150. |
| | Combination | A user port 550 that provides for delivering power and data to the portable access device 150. |
| 600 | Cord or Cable | Cords 600, which can also be referred to as cables 600 or wires 600, are any mechanism that can serve as wired a connection between two ports 500. The media chair apparatus 200 can utilize both wireless and wired connections through the ports 500 in the media chair apparatus 200 and the ports 500 in portable access device 150 and media player 130, |
| | Power Cord | A cord 600 that provides for the delivery of electricity/power. |
| | Data Cord | A cord 600 that provides for the delivery of data. |
| | Combination Cord | A cord 600 that provides for the delivery of both power and data. |
| | USB Cord | A common example of a combination cord. |
| | Ethernet Cord | A common example of data cord. |
| | HDMI Cord | A data cord provides for the delivery of high quality sound and high definition video. |
| | Coaxial Cable | A common example of a data cord. |
| 610 | External Cord/Cable | A cord 600 that connects the operating environment 80 to the media chair apparatus 200. |
| | External Power Cord | A cord 600 that is both an external cord 610 and a power cord. |
| 680 | Internal Cord/Cable | A cord 600 that is internal to the media chair apparatus 200. One or more internal cords 680 are used to connect the user port 550 in the seat assembly 300 to the environment port 510 in the support assembly 400. |
| | Internal Power Cord | A cord 600 that is both a power cord 601 and an internal cord 680. |
| 800 | Media Content | Media content 800 Media content 800 can also be referred to as a media experience 800. Media content 800 is typically accessed and storied in a digital format, but the system 100 can be configured to deliver analog media content 800. Examples of media content 800 can include but are not limited to Many examples of media content 800 are stored on discs such as BLU-RAY, DVD, and CD discs that are played by a corresponding media player 130. Many examples of media content 800 are stored as digital media on a hard drive, such as but are not limited to discs such as BLU-RAY |
| | Audio Attributes | The audio aspects of the media content 800. |
| | Visual Attributes | The visual aspects of the media content 800. |
| | Video Attributes | The video aspects of the media content 800. |
| | Tactile Attributes | The aspects of the media content 800 that are experienced through the sense of touch. |
| | Olfactory Attributes | The aspects of the media content 800 that are experienced through the sense of smell, such as the digital smell that can be conveyed via an OPHONE |
| | Gustatory Attributes | The aspects of the media content 800 that are experienced through the sense of taste, such as what can be conveyed through a digital taste simulator or digital. |
| 900 | Method | A process of providing a media experience while facilitating the relative rotation of a seat assembly relative to a support assembly. |
| 950 | User Authentication | A process for identifying a user and/or authenticating the identity of the user 90. |

The invention claimed is:

1. A media chair apparatus located in an operating environment wherein the media chair apparatus provides for being sat on by a user while accessing media content, said media chair apparatus comprising:
   a seat assembly, said seat assembly including a seat surface, wherein said seat surface provides for supporting the user sitting on said seat surface;
   a support assembly, said support assembly including a base, wherein said base provides for supporting said support assembly, wherein said support assembly provides for supporting said seat assembly, and wherein said seat assembly provides for rotating relative to said support assembly;
   a plurality of ports, said plurality of ports including an environment port and a user port, wherein said environment port is located in said support assembly, said environment port including an environment power port, and wherein said user port is located in said seat assembly, said user port including a user power port; and
   a plurality of cords, said plurality of cords including an external cord and an internal cord, wherein said internal cord connects said environment port to said user port, and wherein said external cord provides for connecting said environment port to the operating environment, and said plurality of cords including a plurality of power cords, said plurality of power cords comprising a plurality of external power cords and an internal power cord, said plurality of external power cords including a first external power cord and a second external power cord, wherein said first external power cord provides for connecting a power source in the operating environment to the environment power port, wherein said internal power cord connects said environment power port to said user power port, and wherein said second external power cord provides for connecting said user power port to a portable access device.

2. The media chair apparatus of claim 1, wherein said seat assembly rotates 360 degrees or more with respect to said support assembly.

3. The media chair apparatus of claim 1, wherein said seat assembly rotates 720 degrees or more with respect to said support assembly, and wherein said support assembly provides for being fixed while said seat assembly rotates.

4. The media chair apparatus of claim 1, wherein said support assembly includes a pneumatic cylinder and a base that includes a plurality of wheels.

5. The media chair apparatus of claim 1, wherein said portable access device is a wearable access device.

6. The media chair apparatus of claim 1, wherein said portable access device is a visor worn on the head of the user.

7. The media chair apparatus of claim 6, said seat assembly further including an adjustable member that provides for supporting said visor.

8. The media chair apparatus of claim 1, wherein said of external cord further includes an external USB cord, and an external Ethernet cord.

9. The media chair apparatus of claim 1, wherein said support assembly provides for being locked into a fixed position while the seat assembly is rotated.

10. The media chair apparatus of claim 1, wherein said seat assembly includes a plurality of controls, said plurality of controls including at least two of: (a) a button; (b) a joystick; (c) a trackpad; and (d) a trackball.

11. The media chair apparatus of claim 1, wherein said seat assembly includes a plurality of sensors, said plurality of sensors including at least two of: (a) a camera; (b) a retina sensor; (c) a fingerprint sensor; (d) a motion sensor; (e) a position sensor; and (f) a microphone.

12. The media chair apparatus of claim 11, wherein said media chair apparatus provides a user authentication heuristic to authenticate an identity associated with the user with data from one or more sensors.

13. The media chair apparatus of claim 1, said media chair apparatus further comprising a plurality of output components, said plurality of output components including a speaker and a haptic feedback mechanism.

14. The media chair apparatus of claim 1, said media chair apparatus further comprising a wireless adaptor.

15. The media chair apparatus of claim 1, said media chair apparatus further comprising a media player.

16. A media system that provides for a user to engage in a media experience while in an operating environment, said system comprising:
   a media chair apparatus, said media chair apparatus including:
      a seat assembly, said seat assembly including a seat surface that provides for supporting the user in a seated position;
      a support assembly, said support assembly provides for being stationary while said seat assembly provides for rotation relative to the support assembly, wherein said seat assembly provides for supporting the user in a seated position, and wherein said support assembly provides for supporting said seat assembly; and
      a plurality of ports, said plurality of ports including an environment port in said support assembly and a user port in said seat assembly;
   a visor that provides for being worn on the head of the user;
   a media player that provides for communicating the media experience to the visor;
   a plurality of external cords, said plurality of external cords including a plurality of external power cords and a plurality of external data cords, said plurality of external power cords including a first external power cord connecting a power source in the operating environment to said environment port, said second external power cord connecting said user port to said visor, said external data cords including a first external data cord connecting said media player to said environment port and a second external data cord connecting said user port to said visor.

17. The media system of claim 16, wherein said media chair apparatus includes a sensor, a control and an output component; wherein said seat assembly further includes a seat surface, an arm rest, a back surface, and an adjustable support member for said visor; wherein said support assembly further includes a base with a plurality of wheels and a pneumatic cylinder; and wherein said plurality of ports include a wireless adaptor.

18. A media chair apparatus comprising:
   a support assembly;
   a seat assembly configured to rotate relative to the support assembly;
   an environment port located in the support assembly;
   a user port located in the seat assembly;
   an internal cord configured to connect the environment port to the user port; and
   an external cord configured to connect the environment port to an operating environment;

wherein said seat assembly includes a plurality of sensors, said plurality of sensors including at least two of: a camera; a retina sensor; a fingerprint sensor; a motion sensor; a position sensor; and a microphone; and wherein said media chair apparatus provides a user authentication heuristic to authenticate an identity associated with the user with data from one or more sensors.

19. The media chair apparatus of claim 18, further comprising:

the environment port including an environment power port;

the user port including a user power port;

a plurality of external power cords and an internal power cord, wherein a first external power cord provides for connecting a power source in the operating environment to the environment power port, wherein the internal power cord connects the environment power port to the user power port, and a second external power cord provides for connecting the user power port to a portable access device.

* * * * *